US010231164B2

(12) United States Patent
Chan

(10) Patent No.: US 10,231,164 B2
(45) Date of Patent: Mar. 12, 2019

(54) SYSTEM AND METHOD FOR DISTRIBUTED AND INTEGRATED MOBILITY SUPPORT FOR MOBILE NETWORKS AND MOBILE HOSTS

(71) Applicant: Futurewei Technologies, Inc., Plano, TX (US)

(72) Inventor: Hinghung Anthony Chan, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/670,944

(22) Filed: Aug. 7, 2017

(65) Prior Publication Data

US 2017/0339624 A1 Nov. 23, 2017

Related U.S. Application Data

(62) Division of application No. 14/595,080, filed on Jan. 12, 2015, now Pat. No. 9,730,141.

(60) Provisional application No. 61/926,135, filed on Jan. 10, 2014.

(51) Int. Cl.
*H04W 4/00* (2018.01)
*H04W 40/20* (2009.01)

(52) U.S. Cl.
CPC .................................. *H04W 40/20* (2013.01)

(58) Field of Classification Search
CPC ....... H04W 40/20; H04W 60/00; H04W 8/26; H04W 80/04
See application file for complete search history.

(56) References Cited

U.S. PATENT DOCUMENTS

| | | | |
|---|---|---|---|
| 6,771,604 B1 | 8/2004 | Dommety et al. | |
| 8,077,648 B2 | 12/2011 | Valko et al. | |
| 8,385,290 B2 | 2/2013 | Kato et al. | |
| 9,055,551 B2* | 6/2015 | Wang | H04W 60/005 |
| 9,167,482 B2 | 10/2015 | Zhu et al. | |
| 2003/0161287 A1 | 8/2003 | Venkitaraman et al. | |
| 2004/0235496 A1 | 11/2004 | Hiyama et al. | |
| 2005/0099971 A1 | 5/2005 | Droms et al. | |
| 2006/0018291 A1* | 1/2006 | Patel | H04L 63/0407 370/335 |
| 2008/0062917 A1 | 3/2008 | Oguchi | |

(Continued)

FOREIGN PATENT DOCUMENTS

| | | |
|---|---|---|
| CN | 1879425 A | 12/2006 |
| WO | 2007024058 A1 | 3/2007 |
| WO | 2007066866 A1 | 6/2007 |

OTHER PUBLICATIONS ( A comprehensive MIPv6 Based mobility management simulation engine for the next generation network, Mar. 15-19, 2010).*

(Continued)

*Primary Examiner* — Maharishi V Khirodhar
(74) *Attorney, Agent, or Firm* — Slater Matsil, LLP

(57) ABSTRACT

A method for updating location information includes detecting a change in mobility of a second device, and determining whether an update condition has been met. When the update condition has been met, the method also includes updating a first location management function in accordance with location information of the second device, and forwarding the location information of the second device to a second location management function.

9 Claims, 19 Drawing Sheets

(56) References Cited

U.S. PATENT DOCUMENTS

| | | |
|---|---|---|
| 2008/0198806 A1* | 8/2008 | Xia .................. H04L 29/12311 370/331 |
| 2009/0022115 A1 | 1/2009 | Berzin et al. |
| 2009/0154396 A1 | 6/2009 | Akiyoshi et al. |
| 2009/0201852 A1* | 8/2009 | Chen .................... H04W 8/082 370/328 |
| 2009/0257375 A1* | 10/2009 | Ishida .................. H04W 68/00 370/328 |
| 2010/0046524 A1* | 2/2010 | Rune .................. H04L 12/4633 370/395.53 |
| 2010/0208706 A1 | 8/2010 | Hirano et al. |
| 2011/0013566 A1* | 1/2011 | Aso ...................... H04W 60/00 370/328 |
| 2011/0080866 A1 | 4/2011 | Chan et al. |
| 2011/0080872 A1 | 4/2011 | Chan et al. |
| 2011/0103340 A1* | 5/2011 | Zhu .................. H04W 36/0011 370/329 |
| 2011/0170479 A1 | 7/2011 | Chan et al. |
| 2011/0261800 A1 | 10/2011 | You et al. |
| 2012/0087357 A1 | 4/2012 | Chan et al. |
| 2013/0176943 A1 | 7/2013 | Chan |

OTHER PUBLICATIONS

Chan, Anthony H., "Proxy Mobile IP with Distributed Mobility Anchors," Department of Electrical Engineering, University of Cap Town, Rondebosch, South Africa, IEEE Globecom 2010 Workshop on Seamless Wireless Mobility, pp. 16-20.

Devarapalli, V., et al., "Network Mobility (NEMO) Basic Support Protocol," Standards Track, Network Working Group, Jan. 2005, 33 pages.

* cited by examiner

SYSTEM AND METHOD FOR DISTRIBUTED AND INTEGRATED MOBILITY SUPPORT FOR MOBILE NETWORKS AND MOBILE HOSTS

This application is a divisional of U.S. patent application Ser. No. 14/595,080, filed on Jan. 12, 2015, entitled "Systems and Methods for Distributed and Integrated Mobility Support for Mobile Networks and Mobile Hosts Network Mobility Management," which application claims the benefit of U.S. Provisional Application No. 61/926,135, filed on Jan. 10, 2014, which applications are hereby incorporated herein by reference.

TECHNICAL FIELD

The present disclosure relates generally to digital communications, and more particularly to a system and method for distributed and integrated mobility support for mobile networks and mobile hosts.

BACKGROUND

Network mobility (NEMO) as specified in IETF RFC3963 NEMO Basic Support Protocol provides host-based mobility support to a mobile router (MR) using mechanisms similar to Mobile IP (MIP). The MR in turn provides network connection to a network of nodes called mobile network nodes (MNNs). When the MR, with its mobile network, moves away from a home network to a visited network, the IP packets are tunneled between the MR and a home agent (HA). Such routes may be long.

SUMMARY OF THE DISCLOSURE

Example embodiments of the present disclosure which provide a system and method for distributed and integrated mobility support for mobile networks and mobile hosts.

In accordance with an example embodiment of the present disclosure, a method for updating location information is provided. The method includes detecting, by a first device, a change in mobility of a second device, and determining, by the first device, that an update condition has been met. When the update condition has been met, the method further comprises updating, by the first device, a first location management function in accordance with location information of the second device, and forwarding, by the first device, the location information of the second device to a second location management function.

In accordance with another example embodiment of the present disclosure, a method for propagating location information is provided. The method includes receiving, by a first device, location information for a second device moving from a first network to a second network, updating, by the first device, a first location management function in accordance with the location information of the second device, and determining, by the first device, that a forward update condition have been met. When the forward update condition has been met, the method also includes forwarding, by the first device, the location information of the second device to a second location management function of a parent network of the first network.

In accordance with another example embodiment of the present disclosure, a method for routing a packet is provided. The method includes matching, by a first device, prefixes of a destination address of an intended recipient of the packet to prefixes in a list of associations, wherein each association includes a prefix of a session address of a second device in an older session and a routing address of the second device in a current session, thereby producing prefix matches, and selecting, by the first device, one of the prefix matches in accordance with prefix match lengths between the first device and the routing addresses of the second device. The method also includes forwarding, by the device, the packet to the routing address of the selected prefix match.

In accordance with another example embodiment of the present disclosure, a first device in a communications system providing network-based mobility management is provided. The first device includes a processor, and a non-transitory computer readable storage medium storing programming for execution by the processor. The programming includes instructions to detect a change in mobility of a second device, determine that an update condition has been met, and when the update condition has been met, update a first location management function in accordance with location information of the second device, and forward the location information of the second device to a second location management function.

In accordance with another example embodiment of the present disclosure, a first device in a communications system providing network-based mobility management is provided. The first device includes a processor, and a non-transitory computer readable storage medium storing programming for execution by the processor. The programming includes instructions to receive location information for a second device moving from a first network to a second network, update a first location management function in accordance with the location information of the second device, determine that a forward update condition have been met, and when the forward update conditions have been met, forward the location information of the second device to a second location management function of a parent network of the first network.

One advantage of an embodiment is that the use of same generalized mobility management functions in mobility management for mobile nodes and mobility management for mobile networks helps to prevent pinball routes, which make routes unnecessarily long.

A further advantage of an embodiment is that shortening routes by eliminating pinball routes helps to reduce latency, communications overhead, and the like.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to distributed and integrated mobility support for mobile networks and mobile hosts. For example, a first device detects a change in mobility of a second device, and determines that an update condition has been met. When the update condition has been met, the first device further updates a first location management function in accordance with location information of the second device, and forwards the location information of the second device to a second location management function.

The present disclosure will be described with respect to example embodiments in a specific context, namely communications systems that provide mobility support for mobile networks and mobile hosts. The disclosure may be applied to standards compliant communications systems and non-standards compliant communications systems that provide mobility support for mobile networks and mobile hosts.

Figure 1:
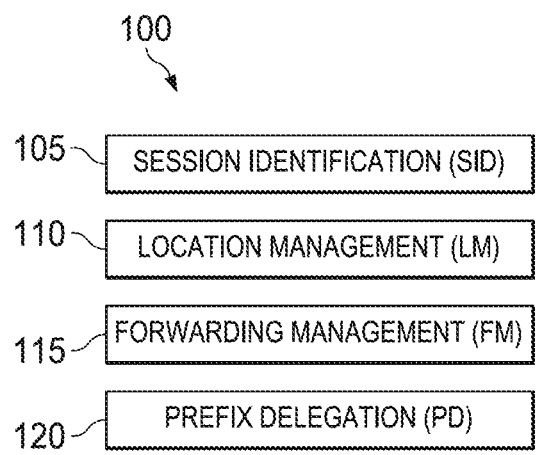
FIG. 1 illustrates an example mobility management function according to example embodiments described herein.

FIG. 1 illustrates an example mobility management function 100. Mobility management function 100 includes a session identification (SID) function 105, a location management (LM) function 110, a forwarding management (FM) function 115, and a prefix delegation (PD) function 120. The functions making up mobility management function 100 may be implemented in a single entity, or separate entities. The functions may also be implemented in a centralized manner or a distributed manner.

SID function 105: A mobile node (MN) may use a SID to enable session continuity for an application during a handover. Alternatively, a separate IP address that is different from the routing IP address, such as one used previously in the home network where the application was initiated, may be used as the SID. In the latter case, SID function 105 may be tied to the IP prefix function at the home network. In addition, a MN with multiple ongoing applications may use multiple prefixes. SID function 105 may be able to associate each prefix with applications actively using the prefix and release the prefix when applications no longer have a need to use it.

LM function 110: In general, the Internet is already managing the needed information of static hosts to enable routing using the IP addresses of each host as a locator. LM function no may keep track of the internetwork location of an MN which may change its IP address as it moves. The location information may associate with each SID, the IP routing address of the MN or of a node that can forward packets destined to the MN. In a client-server model of a system, location query and update messages may be exchanged between a client (LMc) and a server (LMs). Furthermore, one (or more) proxy (proxies) may exist between the LMs and the LMc, i.e., LMS-proxy-LMc. Then, to a LMs, the proxy behaves like a LMc, while to a LMc, the proxy behaves like the LMs.

FM function 115: In principle, it is possible to update the routing tables according to LM information. However, it may sometimes be not practical or not scalable to update the routing tables dynamically to reflect fast changes of locations, especially when a very large number of MNs are in the Internet. FM function 115 may be an additional routing function beyond those provided by the routing tables, such as for forwarding packets using a tunnel, rewriting a packet header to route using another IP address, and the like. It may be sufficient to have this additional function in a limited number of special routers. The FM functions implemented in these routers may intercept packets to and/or from the MN and forward the packets, based on the internetwork location information, either to the destination or to some other network element that knows how to forward the packets to the destination.

PD function 120: A mobility router (MR) that provides network support to a number of nodes in a mobile network may also allocate IP addresses to the nodes in its mobile network. PD function 120 may have IP prefix delegation function to be delegated a range of IP prefixes which the MR uses to allocate to the nodes in the mobile network.

As will be discussed below, the mobility of a MR and/or a MNN may lead to a situation wherein packets are routed unnecessarily between networks, leading to routes that are longer than needed. Such a situation is referred to as pinball routing.

Figure 2:
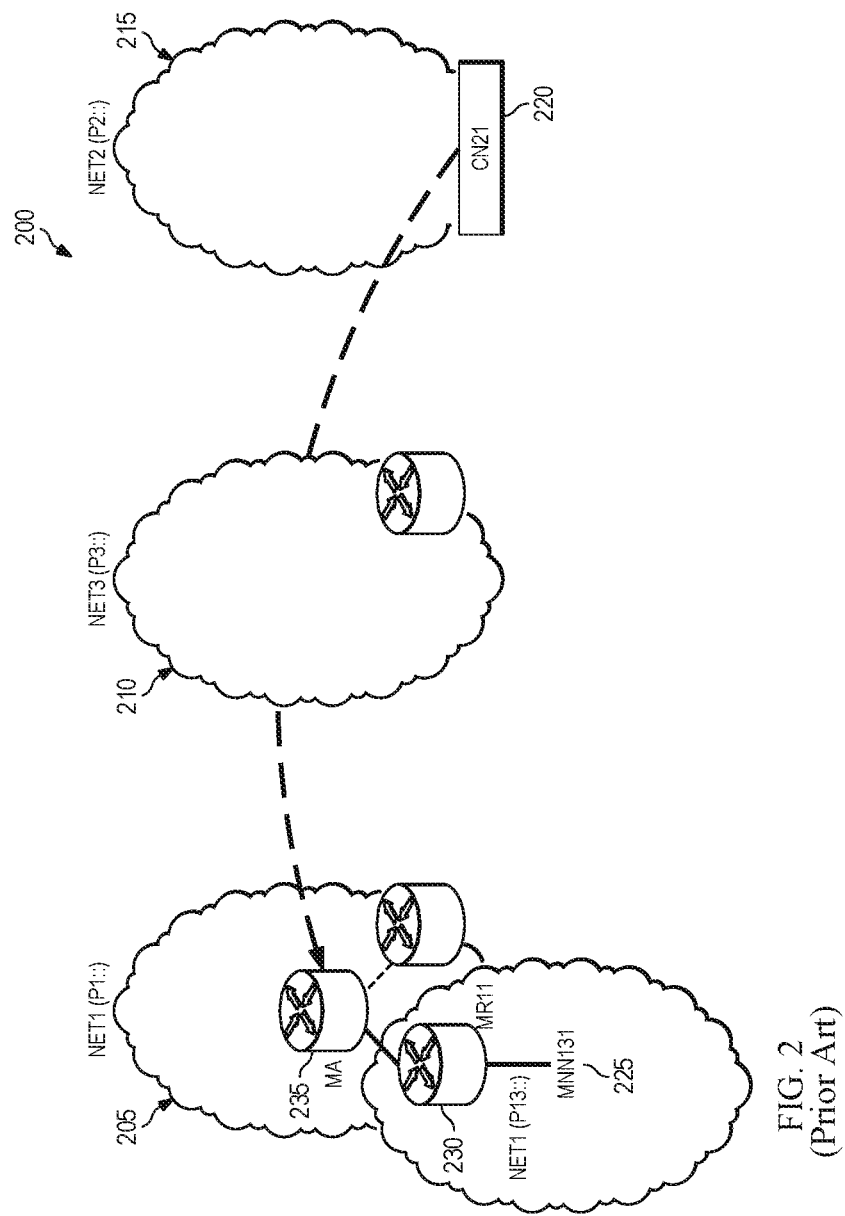
FIG. 2 illustrates an example system highlighting mobility of mobile networks and mobile hosts according to example embodiments described herein.

FIG. 2 illustrates an example system 200 highlighting mobility of mobile networks and mobile hosts. System 200 includes a plurality of networks, including a first network (NET1) 205, a second network (NET3) 210, and a third network (NET2) 215. Also included in system 200 is a correspondent node (CN) 220 that has established a session with a MNN 225, which is operating with a mobile network of MR 230 and mobility anchor (MA) 235 of first network 205. Packets may be exchanged between CN 220 and MNN 225. As an illustrative example, a packet sent from CN 220 to MNN 225 may be first routed to MA 235, then to MR 230, and finally to MNN 225.

Figure 3:
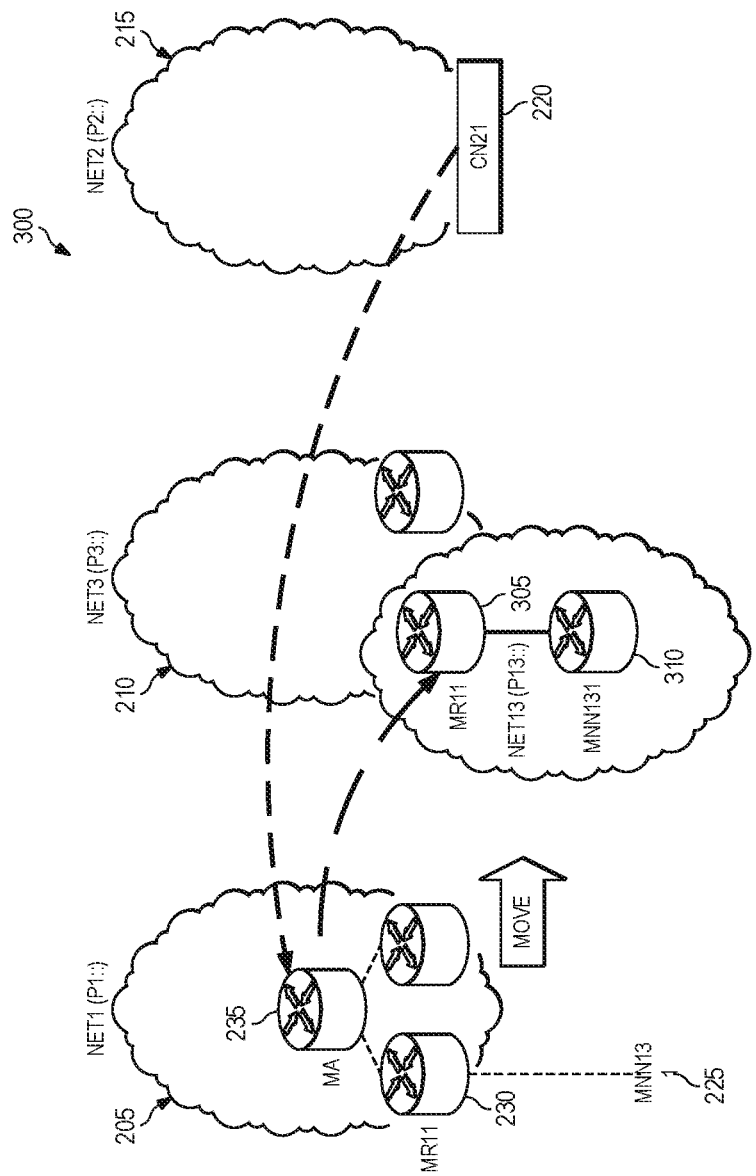
FIG. 3 illustrates an example system highlighting mobile network mobility according to example embodiments described herein.

FIG. 3 illustrates an example system 300 highlighting mobile network mobility. As shown in FIG. 3, a MR (formerly MR 230) moves from first network 205 to second network 210 (shown as MR 305 to prevent confusion). Since the MR has changed networks, MNNs that are supported by the MR also move. As an illustrative example, MNN 225 has also moved to second network 210, where it is shown as MNN 310 to prevent confusion. As a result of the mobility, packets from CN 220 to MNN 310 now pass through MA 235, MR 305, and then to MNN 310.

Figure 4:
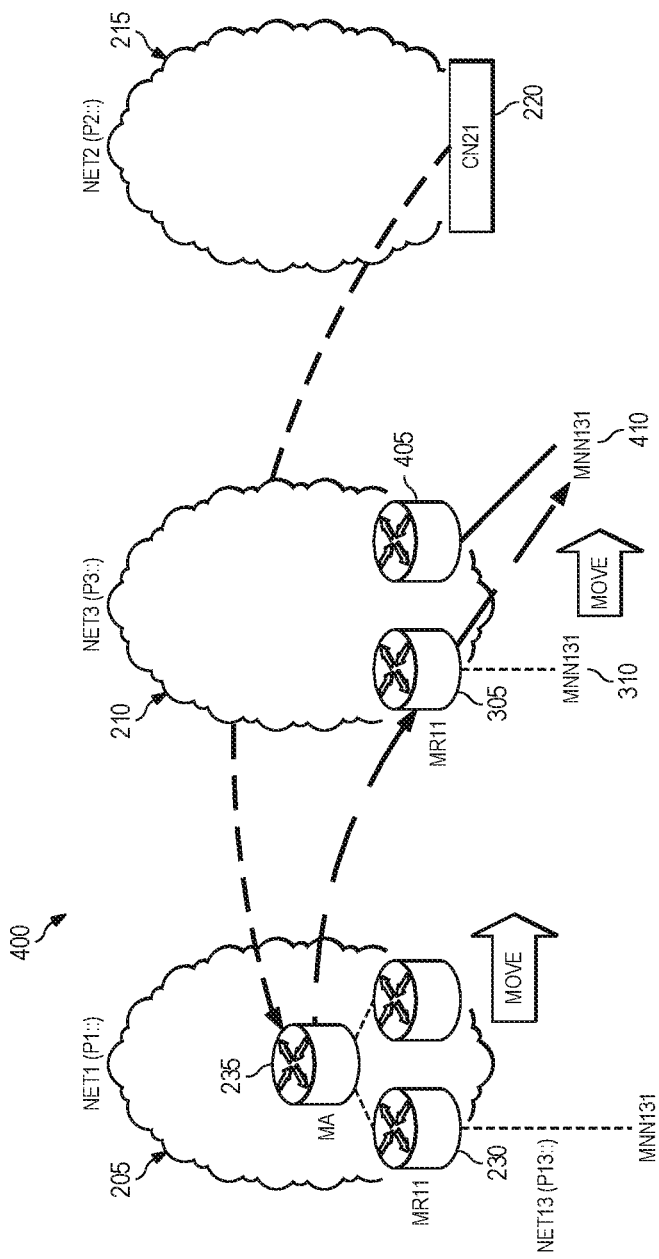
FIG. 4 illustrates an example system highlighting MNN mobility after mobile network mobility according to example embodiments described herein.

FIG. 4 illustrates an example system 400 highlighting MNN mobility after mobile network mobility. As shown in FIG. 4, a MNN (formerly MNN 310) moves from a mobile network supported by MR 305 to a different access network that is supported by an access router 405 (the MNN is shown as MNN 410 to prevent confusion). As a result of the mobility, packets from CN 220 to MNN 410 now pass through MA 235, MR 305, and then to MNN 410. However, MNN 410 is no longer operating with MR 305.

Figure 5:
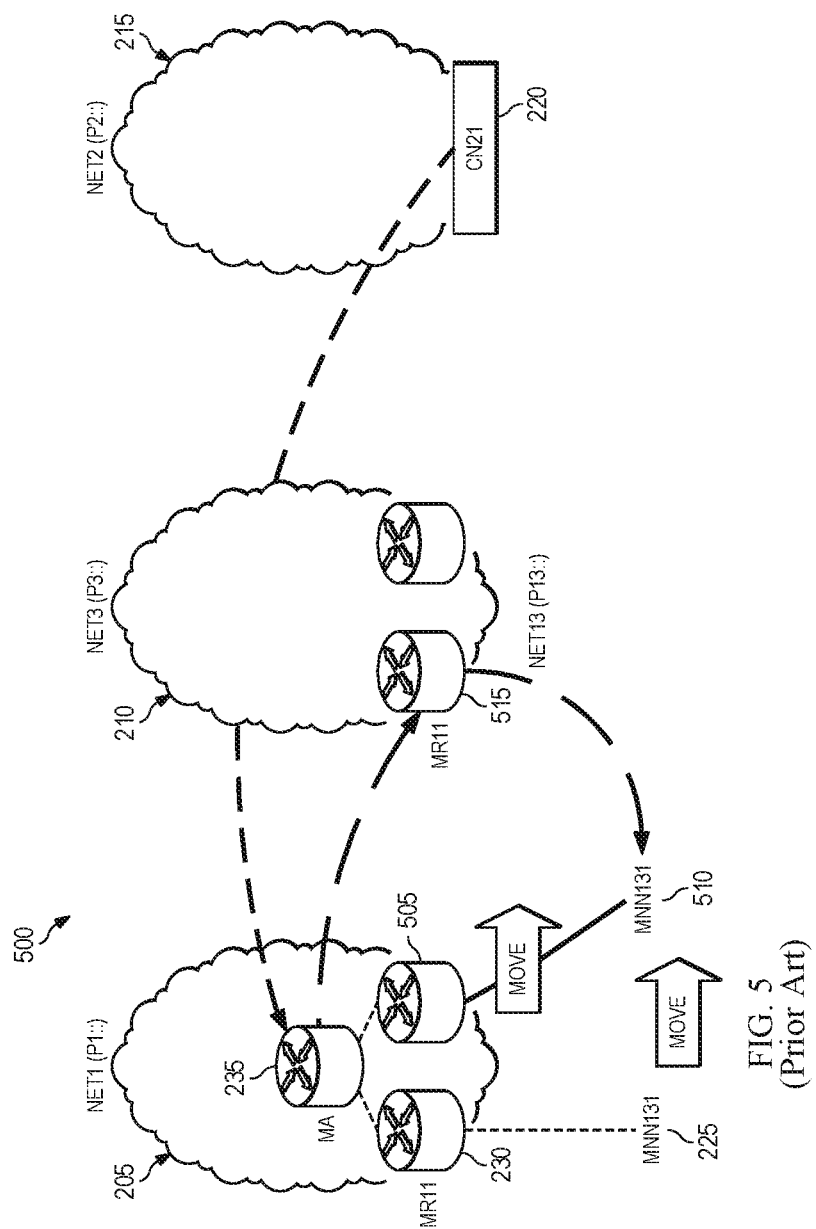
FIG. 5 illustrates an example system highlighting MNN mobility prior to mobile network mobility according to example embodiments described herein.

FIG. 5 illustrates an example system 500 highlighting MNN mobility prior to mobile network mobility. System 500 includes a plurality of networks, including first network 205, second network 210, and third network 215. Also included in system 500 is CN 220 has established a session with MNN 225, which is operating with a mobile network of MR 230 and MA 235 of first network 205. MNN 225 moves away from MR 230 to a mobile network supported by a router 505, where it is shown as MNN 510 to prevent confusion. After MNN 225 (now MNN 510) moves to router 505, MR 230 moves to second network 210, where it is shown as MR 515 to prevent confusion. Although MNN 225 (now MNN 510) is no longer part of MR 230 (now MR 515), disjointed mobility management has resulted in preservation of routes that are longer than necessary. As a result of the mobility, packets from CN 220 to MNN 510 now pass through MA 235, MR 515, and then to MNN 510, making an unnecessary trip to second network 210 and back to first network 205. The route of packets from CN 220 to MNN 510 is an example of a pinball route.

As shown above, pinball routes may occur when mobility support for mobile hosts (such as through mobile IP) and mobility support for mobile networks are both involved and when mobile networks are nested. The MNNs operating under MRs may again be mobile using mobile IP for mobility support. When a MNN also moves and uses mobile IP, the mobility support is enabled through the use of tunnels between the MNN and the HA of the mobile IP. Tunnels within tunnels are therefore formed, resulting in pinball routes that bounce between multiple HAs. Furthermore, as MRs move, one MR may attach to a different MR to form a nested mobility network. Again, tunnels may be formed within tunnels, resulting in pinball routes that bounce between multiple HAs.

According to an example embodiment, the same mobility management functions (i.e., SID functions, LM functions, FM functions, and PD functions) are used to provide mobility support for both mobile hosts and mobile networks. The use of the same mobility management functions for providing mobility support for mobile hosts and mobile networks enable sharing of mobility information about the mobility of the mobile hosts and the mobile networks. It may be possible to prevent the formation of or the elimination of tunnels within tunnels, thereby preventing (or reducing) pinball routes. The use of the same mobility management functions for providing mobility support for mobile hosts and mobile networks is integrated network and host mobility management, which may be network-based or host-based.

According to an example embodiment, a distributed approach to the integrated network and host mobility management is used. The mobility management functions may be separated into generalized functions for both mobile hosts and mobile networks. The use of a distributed approach may help to reduce communications overhead involved in updating mobility information, which would negatively impact overall communications system performance.

Figure 6:
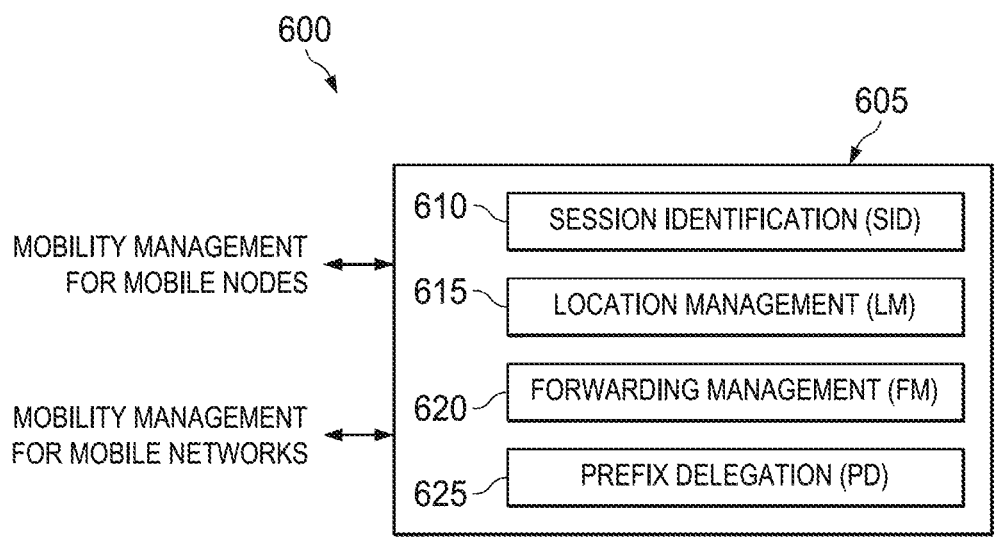
FIG. 6 illustrates an example mobility management system for providing mobility support for both mobile hosts and mobile networks according to example embodiments described herein.

FIG. 6 illustrates an example mobility management system 600 for providing mobility support for both mobile hosts and mobile networks, i.e., integrated network and host mobility management. Mobility management system 600 includes a mobility management unit 605 for providing mobility management for mobile nodes and mobile networks. Mobility management unit 605 includes a session identification (SID) function 610, a location management (LM) function 615, a forwarding management (FM) function 620, and a prefix delegation (PD) function 625. The various (logical) functions of mobility management unit 605 may operate as described herein.

Although shown as a single unit, mobility management unit 605 may be configured so that different (logical) functions may be implemented in different units. As a first illustrative example, FM function 620 may be implemented in a gateway (GW), while PD function 625 may be implemented in a MR, and LM and SID functions 615 and 610 may be implemented in a standalone unit. As a second illustrative example, PD, FM, and LM functions 625, 620, and 615 may be implemented in a MR, while SID function 610 may be implemented in a standalone unit. Additionally, networks in a communications system may implement the functions of mobility management unit 605 differently, without a single consistent implementation across the various networks present in the communications system. Therefore, the illustration of the functions of mobility management unit 605 being implemented in a single unit should not be construed as being limiting to either the scope or the spirit of the example embodiments.

Similarly, a function of mobility management unit 605 may be implemented in a first of several parts in a first unit, a second part in a second unit, and so on. Furthermore, a single unit may implement a part of a first function and a part of a second function. In other words, the functions of mobility management unit 605 may be implemented in a distributed manner. The discussion presented below may provide multiple example implementations of the functions of mobility management unit 605. The example implementations presented herein are intended to be for illustrative and discussion purposes only. They are not intended to be an exhaustive listing of possible implementations of the functions of mobility management unit 605.

Figure 7:
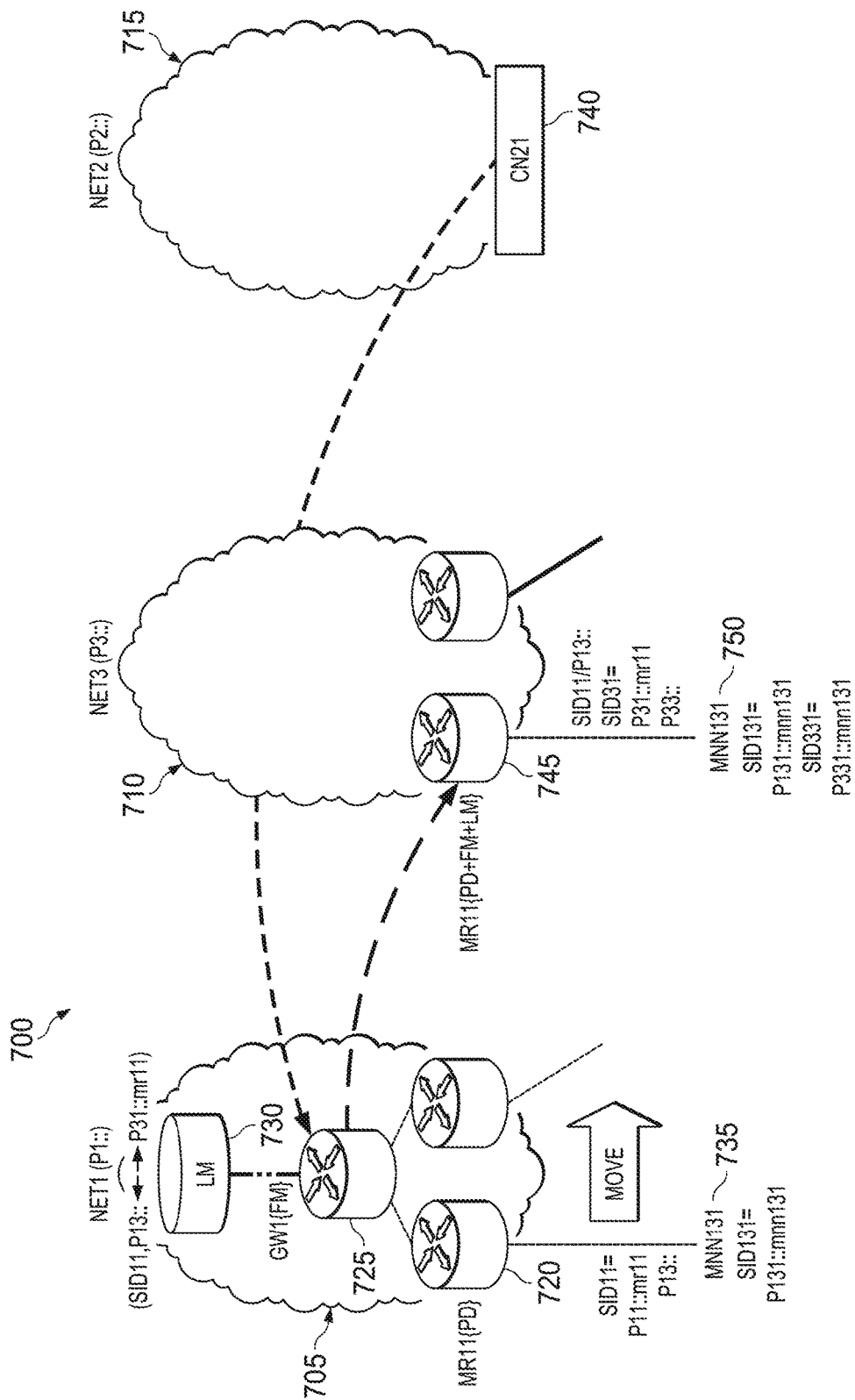
FIG. 7 illustrates an example system highlighting integrated network and host mobility management according to example embodiments described herein.

FIG. 7 illustrates an example system 700 highlighting integrated network and host mobility management. System 700 includes a first network 705, a second network 710, and a third network 715. A MR (MR11) 720, originally attached to first network 705, is shown. First network 705 allocates prefixes P1::/64, which are aggregated. Ingress and egress to first network 705 may be achieved through GW 725. As shown in FIG. 7, GW 725 implements the FM function of the mobility management functions. First network 705 also includes a LM function in LM server 730. Although LM is shown as a standalone logical function, it can be implemented in GW 725. MR 720 implements a PD function of the mobility management functions for MNN operating within its mobile network.

MR 720 has an IP prefix P11 which is configured with the IP address P11::mr11. This IP address is also the session ID, SID11. MR 720 has the capability to obtain prefix delegation of a block of prefixes, e.g., P13::/, so that it may allocate prefixes from P13::/ to nodes in its mobile network. As an illustrative example, a MNN (MNN 131) 735 has been allocated the prefix P131 and has configured the IP address P131::mnn131, which is also equal to its SID, SID131. Similarly, another MNN (not shown in FIG. 7) in the mobile network may be configured with the IP address P132::mnn132. It is noted that as shown in FIG. 7, there is a session between MNN 735 and CN 740.

At a later time, MR 720 moves with its mobile network to second network 710, where MR 720 is relabeled MR 745 and MNN 735 is relabeled MNN 750 to help prevent confusion. Although MR 720 and its mobile network have moved, the communications session between MNN 735 (now MNN 750) and CN 740 is still active and needs session continuity.

As shown in FIG. 7, MR 745 implements mobility management functions PD, FM, and LM. For its own mobility, MR 745 configures a new routing address by obtaining a new IP prefix, e.g., P31::/64, to configure the IP address P31:mr11. MR 745 may send a location update to LM 730 of first network 705 with the association of (SID11←→P31::mr11). Because MR 745 is also carrying a network with multiple MNN's attached to it, it is responsible for sending location updates also for all these MNNs. MR 745 is responsible for sending location update for all these MNNs to first network 705 so that any packet destined for any of these MNNs will be forwarded to MR11 745 at the new routing address P31::mr11. There is then potentially one such association for each MNN attached to the network carried by MR 745. Because all these MNN were allocated prefixes by MR 745 from the block P13, it is simpler to aggregate these prefixes of MNN to a shorter prefix P13. The aggregated location information will then be the association (P13←→P31::mr11). MR 745 may also inform LM 730 of the first network 705 the association of (P13←→P31::mr11). In addition, MR 745 may obtain from second network 710 prefix delegation for allocating prefixes from P33 to its nodes. In general, an association is one example implementation of the location information. An association for a device may include a prefix of an existing destination address of the device and a routing address of the device, and for the prefix of the destination address of an older session and the routing address to be noted as an association means that there is a binding between routing address and the prefix of the destination address of the older session. Using the association (P13←→P31::mr11) as an example, the existence of the association means that there is a binding between the routing address P31::mr11, which is the new address of MR 745, and prefix P13::/, which is the IP prefix obtained by MR 745 while in first network 705. As discussed previously, aggregation may be applied to multiple associations to simplify notation.

As an illustrative example, MR 745 allocates to MNN 750 the new prefix P331 to configure the address P331::mnn131. MNN 750 may use the new address for new sessions that it will start while in second network 710. Forwarding will then take the direct route. Meanwhile, the old address of MNN 750, P131::mnn131, becomes deprecated, and a bi-directional tunnel is established between the FM function at GW 725 and MR 745. MR 745 may also provide mobility management support to MNN 750 by enabling MNN 750 to continue to use the old address for ongoing sessions requiring session continuity. Packets from CN 740 destined to the deprecated address of MNN 750, P131::mnn131, will first arrive at the FM function of GW 725. The FM function of GW 725, with the help of the LM information (P13←→P31::mr11) may tunnel the packets to the address P31:mr11 of MR 745, which will then deliver to the address P131::mnn131 of MNN 750.

Figure 8:
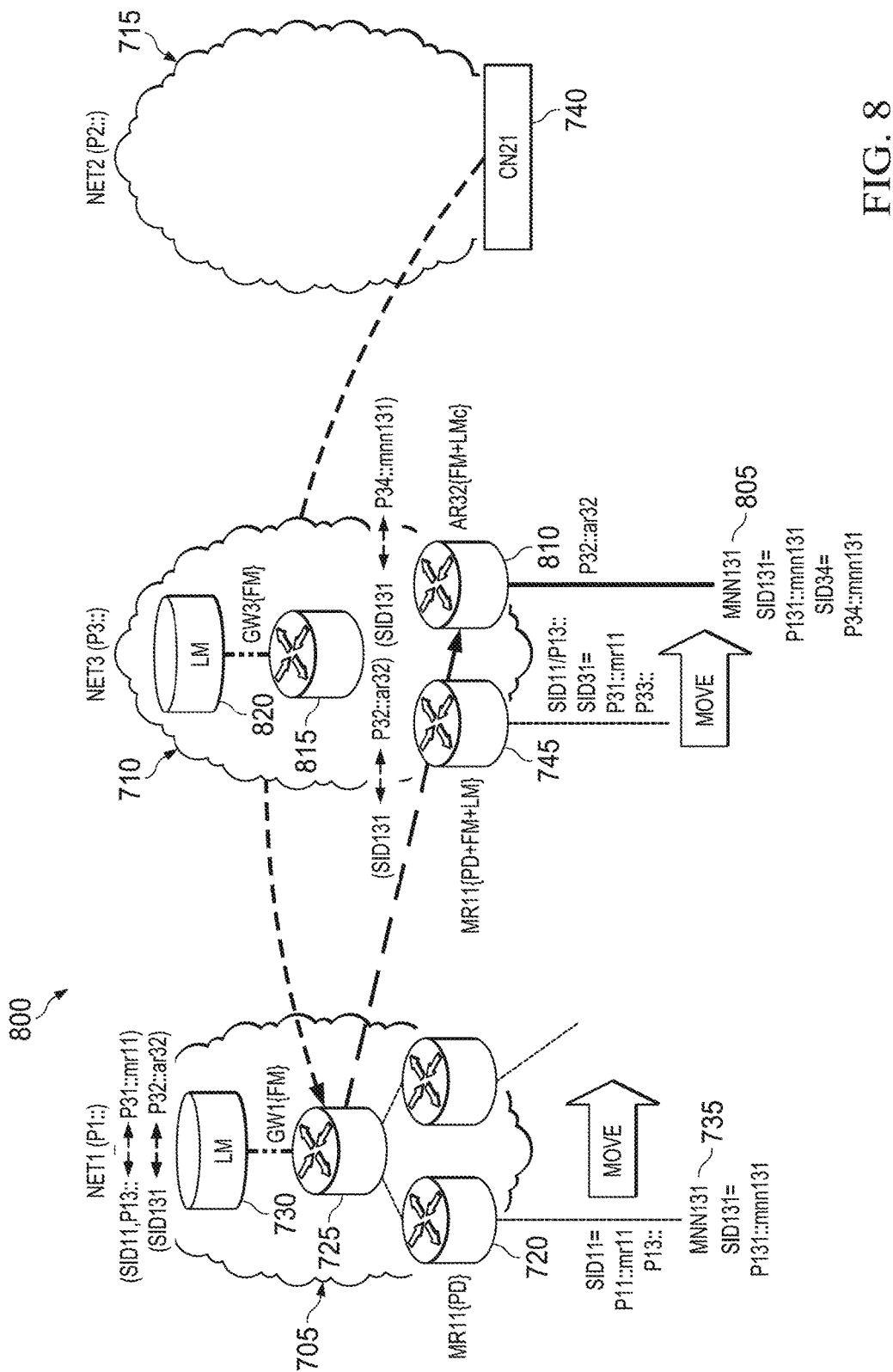
FIG. 8 illustrates an example system with integrated network and host mobility management, highlighting MNN utilizing network-based mobility according to example embodiments described herein.

FIG. 8 illustrates an example system 800 with integrated network and host mobility management, highlighting MNN utilizing network-based mobility. The integrated network and host mobility management system consists of multiple networks (e.g., Net1 (first network 705) and Net3 (second network 710)) each with the mobility management functions. The LMs in each network keeps the LM information for the IP prefixes in that network, but the different LMs and FM in the different networks are coupled in the sense that the FM and LM of each network may perform mobility management signaling with those in another network. The LM servers in different network may be coupled to each other so that they are the servers of the same distributed database for all the IP prefixes in the different networks. Second network 710 includes a GW 815, which implements the FM function of mobility management) and a LM 820 that implements the LM function of integrated network and host mobility management.

System 800 illustrates a special case of system 700 where MNN 735 is also mobile. If MNN 735 is also mobile, it may be able to move outside of the mobile network. As shown in FIG. 8, MNN 805 (formerly MNN 735 and MNN 750) moves out of the mobile network of MR 745 and attaches to AR (AR32) 810. AR 810 may have FM and LMc functions to provide network-based mobility management. AR 810 may perform a location information update (binding between SID and routing IP address) on behalf of MNN 805. AR 810 may send the association (SID131←→P32::ar32) to LM 82o. Because SID131 is equal to an IP prefix that is allocated by first network 705, this association may be passed to LM 730. MNN 805 may obtain a new routing address by first obtaining prefix P34::/64 from second network 710 to configure the address P34::mnn131. This new routing address is used for all new sessions while MNN 805 is attached to AR 810. The old address P131::mnn131 remains depreciated. Packets from CN 740 destined to address P131::mnn131 first arrive at the FM function of GW 725, and the FM function may check the association. There may be matches to 2 associations: (P13←∝P31::mr11) and (SID131←→P32::ar32). The latter match, which is also the longer prefix match, is used. Therefore MR 720 tunnels the packet to AR 810 at the address P32::ar32. It is noted that had the association (P13←→P31::mr11) been used instead, the packets will be bounced with the tunnel to the address P31::mr11 of MR 745. MR 745 will use the association (SID131←→P32::ar32) to again bounce the packets to AR 810 with the tunnel to the address P32::ar32. In general, a route is longer if there are more hops in the route.

Figure 9:
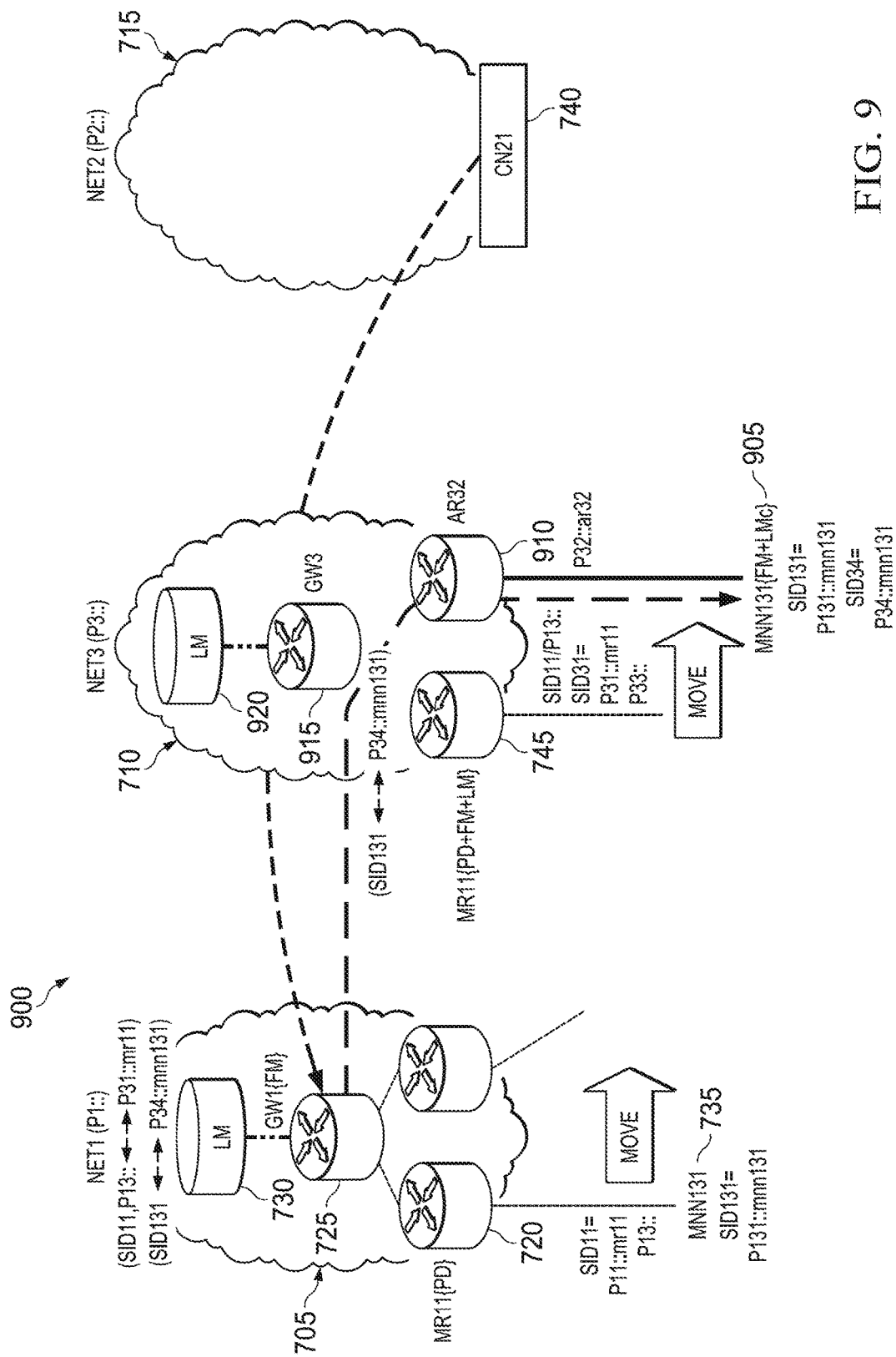
FIG. 9 illustrates an example system with integrated network and host mobility management, highlighting MNN mobility in a MNN with host-based mobility management capabilities according to example embodiments described herein.

FIG. 9 illustrates an example system 900 with integrated network and host mobility management, highlighting MNN mobility in a MNN with host-based mobility management capabilities. System 900 illustrates a special case of system 700 where MNN 735 is also mobile and has host-based mobility management capabilities. If MNN 735 is also mobile, it may be able to move outside of the mobile network. As MNN 735 moves away from the mobile network and attached to AR (AR32) 910, it invokes host-based mobility management support (now shown as MNN 905 to avoid confusion). MR 745 may provide host-based mobility management for MNN 905 by enabling MNN 905 to continue to use the old address for ongoing sessions that require session continuity. A new association (SID131::, P34::mnn131) is established so that if packets from CN 740 destined to the depreciated address P131::mnn131 reaches the FM function of MR 745, it will use the association to tunnel the packet to P34::mnn131.

An MNN that has been allocated an IP prefix (from P13::/, for example) from the mobile network of MR 745 may leave the mobile network by invoking host-based mobility management. The mobile network may then manage an association for the IP prefix to a new IP address of the MNN. However, because the prefix was delegated from first network 705 and MR is using the mobility support of first network 705, MR 745 may also need to inform first network 705 about such an association. Furthermore, LM 730 of first network 705 may already have the association (P13←→P31::mr11) when MR 720 moved to second network 710 to become MR 745 and obtained the IP address P31::mr11. LM 730 may therefore have the association (P13←→P31::mr11) in addition to the association (P131←→P34::mnn131).

Packets from CN 740 destined for P131::mn131 may arrive first at the FM function of GW 725 of first network 705. Its prefix may find matches to both P13:: and P131::. If the association (P13←→P31::mr11) had been used by the FM function of GW 725, the packet would be tunneled to MR 745, which may in turn use the association (P131←→P34::mnn131) to tunnel the packet to MNN 905. The longest prefix match is followed so that the association (P131←→P34::mn131) is used. The packet may be tunneled directly from the FM function of GW 725 to the address P34::mnn131 of MNN 905 as shown in FIG. 9.

Figure 10A:
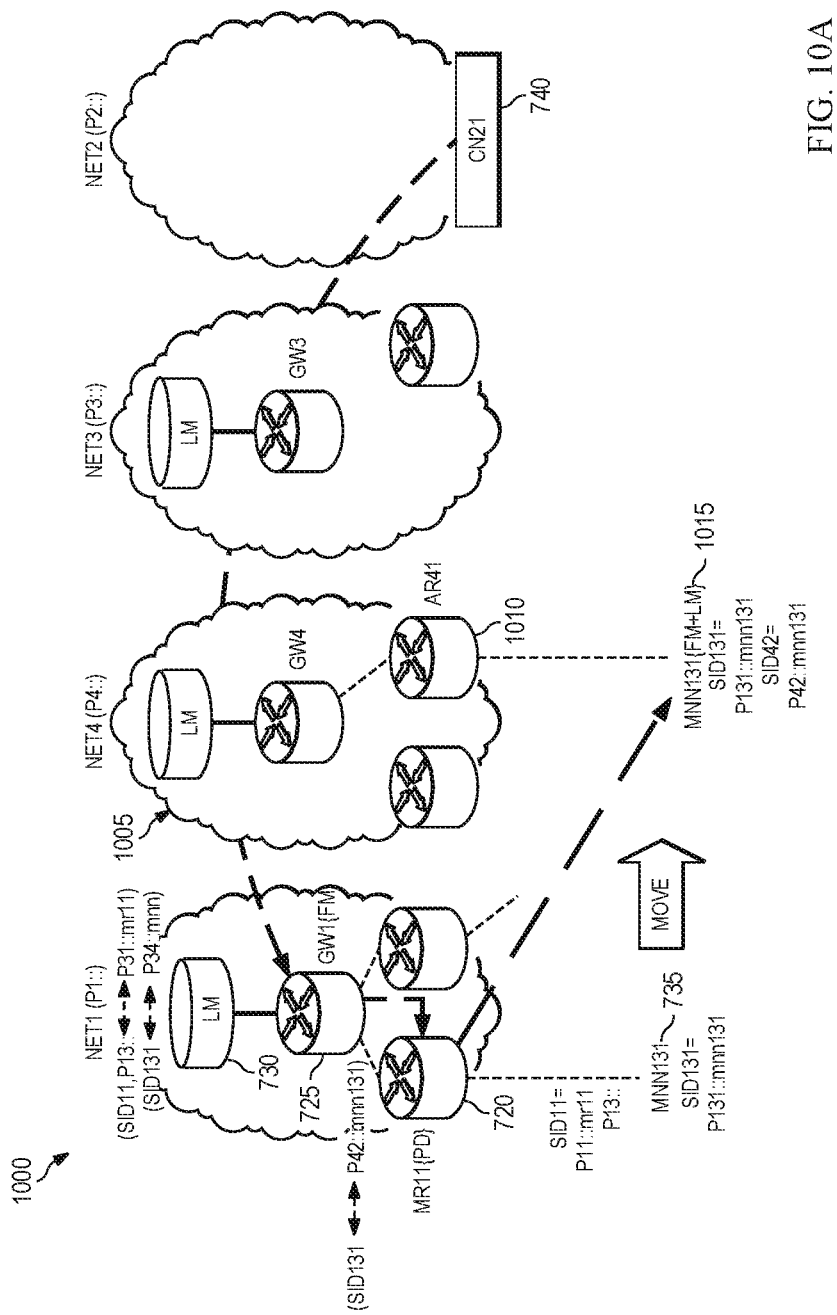
FIG. 10a illustrates an example system with integrated network and host mobility management, highlighting a situation where a MNN moves first using host-based mobility support according to example embodiments described herein.
Figure 10B:
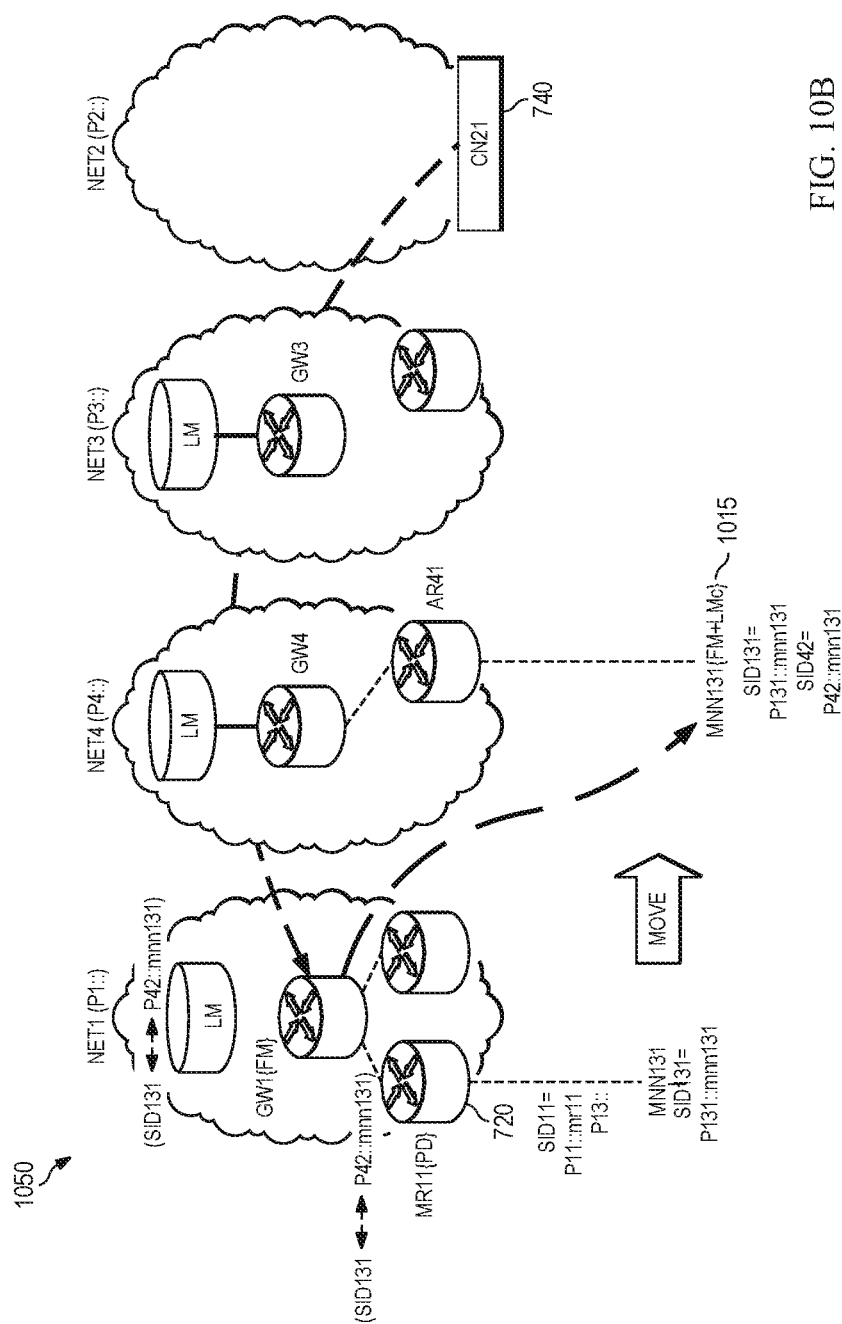
FIG. 10b illustrates an alternate example system with integrated network and host mobility management, highlighting an indirect route according to example embodiments described herein.

FIG. 10a illustrates an example system 1000 with integrated network and host mobility management, highlighting a situation where a MNN moves first using host-based mobility support. System 1000 illustrates another special case of system 700 with a fourth network 1005. As shown in FIG. 10A, MNN 735 moves outside of the mobile network of MR 720 invoking host-based mobility support. MNN 735 attaches to AR 1010 where it is shown as MNN 1015 to prevent confusion. MNN 1015 is allocated a new IP prefix IP42 with which it is configured the IP address IP42::mnn131. The old IP address IP131::mnn131 may be depreciated but MR 720 which originally supported MNN 735 may continue to support the use of the depreciated address IP131::mnn131 for existing sessions by establishing a new association (SID131←→P42::mnn131). If packets from CN 740 destined for the depreciated address P131::mnn131 reach MR 720, MR 720 may use the association to tunnel the packets to P42::mnn131. It may be more direct to tunnel directly from GW 725 to MNN 1015 as follows: since the prefix P131:: is delegated from first network 705 to MR 720 and MR is using the mobility support from the first network 705, as MNN 735 moves to a different network, MR 720 may report the association (e.g., SID131←→P42::mnn131) to first network 705; then as the packets from CN 740 destined for P131::mnn131 arrive at first network 705 at GW 725, the FM function at GW 725 may use the association (SID131←→P42::mnn131) from LM 730 to tunnel the packets directly to MNN 1015 at the address P42::mnn131. FIG. 10b illustrates an alternate example system 1050 where MR did not report the association to the first network, highlighting an indirect route from NR 720 to MNN 1015.

Figure 11:
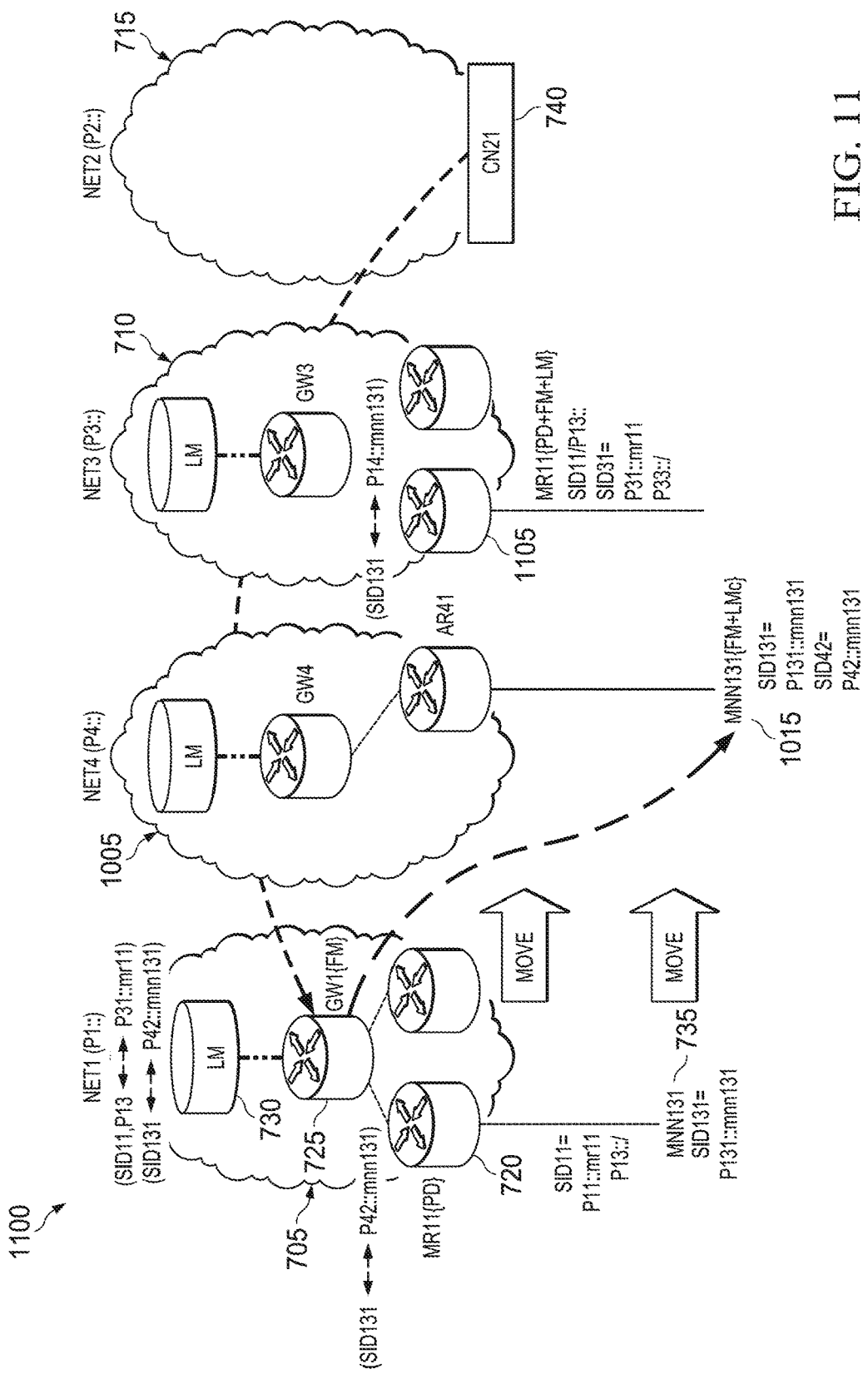
FIG. 11 illustrates an example system with integrated network and host mobility management, highlighting a situation where a MNN moves using host-based mobility management before a MR moves according to example embodiments described herein.

FIG. 11 illustrates an example system 1100 with integrated network and host mobility management, highlighting a situation where a MNN moves using host-based mobility management before a MR moves. System 1100 illustrates a special case of system 1000 where a MNN moves using host-based mobility management prior to a MR moving. MR 720 may subsequently move to second network 710 and acquire a new IP address P31::mr11, where it is shown as MR 1105 to prevent confusion. MR 1105 may report its new location to first network 705 so that associations (SID11←→P31::mr11), (P13←→P31::mr11) and (SID131←→P14::mr11) may be produced at LM 730 of first network 705.

When packets from CN 740 destined for the depreciated address P131::mnn131 reaches first network 705 at GW 725, the prefix may have 2 matches. There is a shorter match to the association (P13←→P31::MR11) and there is a longer match to the association (P131←→P42::mnn131). If the shorter match is used, the packets may be tunneled to address P31::mr11 of MR 1105, which in turn will tunnel the packets to MNN 1015 using the association (P131←→P42::mnn131). The packets would have been bounced twice in pinball routes. The longest route may be specified as a route with the largest number of hops. In general, the longer or longest prefix match is selected. When the longest prefix match is selected, the FM function of GW 725 will tunnel the packets directly to MNN 2015 at address P42::mnn131.

Figure 12A:
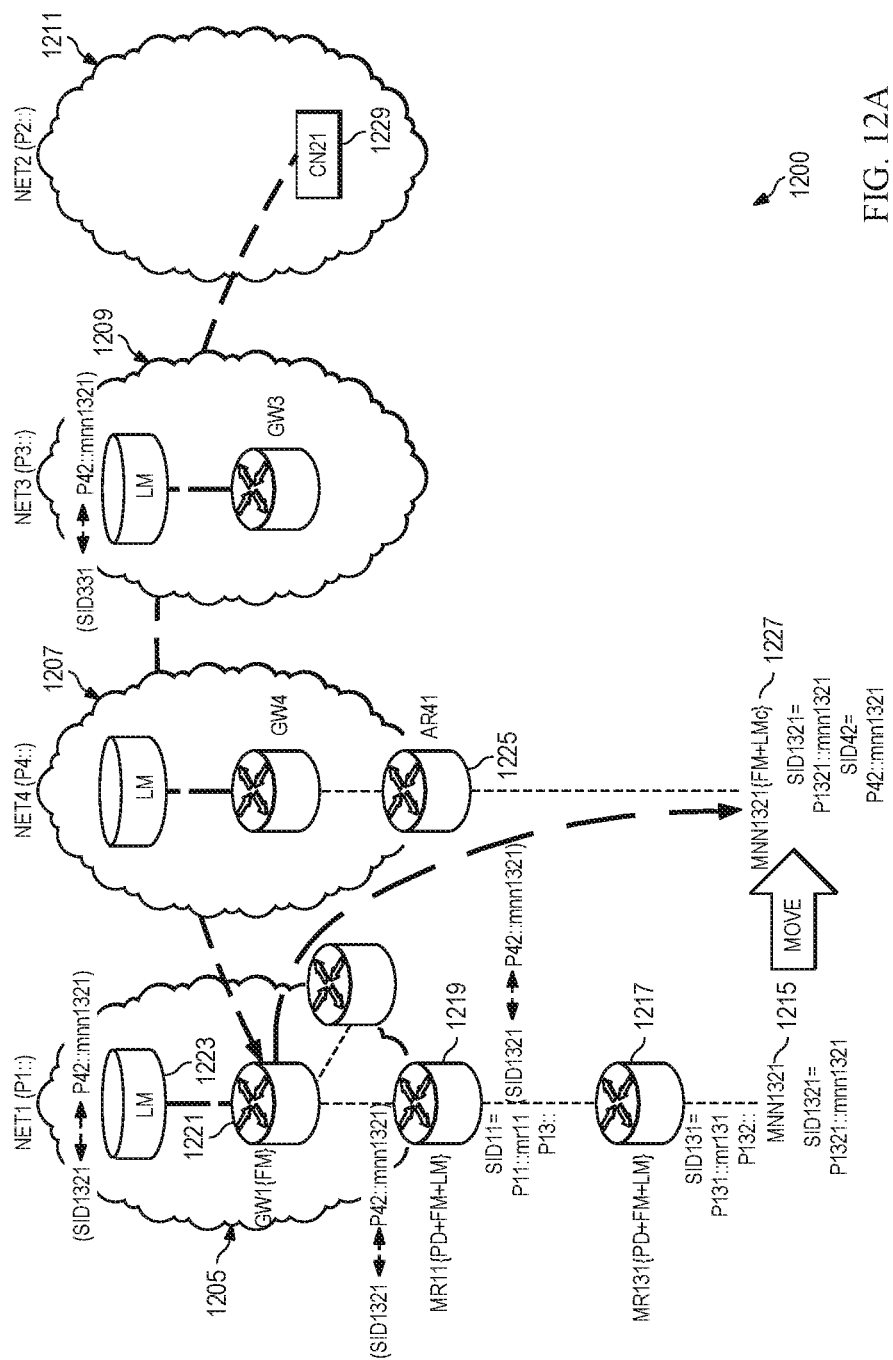
FIG. 12a illustrates an example system with integrated network and host mobility management with nested mobile networks, highlighting a situation where a MNN using host-based mobility support and the MR may also move, according to example embodiments described herein.

FIG. 12a illustrates an example system 1200 with integrated network and host mobility management with nested mobile networks, highlighting a situation where a MNN using host-based mobility support and the MR may also move. System 1200 includes a first network 1205, a second network 1207, a third network 1209, and a fourth network 1211. A MNN 1215 is part of a mobile network supported by MR 1217, which is in turn, a part of a mobile network supported by MR 1219. A GW 1221 implements a FM function, while the LM function is supported by LM 1223.

As shown in FIG. 12a, MNN 1215 was attached to a mobile network supported by MR 1217, which is in turn attached to another mobile network supported by MR 1219.

Whether MR 1219 or MR 1217 moves or not is not explicitly shown in the figure, but both cases are possible. In both cases, MR 1219 which attaches to first network 1205 has acquired an IP prefix P11 to configure the IP address P11::mr11. It has also been delegated a block of IP prefixes P13::/with which it may allocate to the nodes in its mobile network. As MR 1217 attaches to this mobile network (the mobile network supported by MR 1219), it has acquired an IP prefix P131 to configure the IP address P131::mnn131. It is also delegated a block of IP prefixes P132::/ from which it may allocate IP prefixes to its mobile network.

MNN 1215 may simply use host-based mobility support to move away from the mobile network supported by MR 1217, and attaches to another access network (which may or may not be mobile) supported by AR 1225. Prior to the move, MNN 1215 had acquired a prefix P1321:: with which the IP address P1321::mnn1321 was configured. After the move, MNN 1215 (now shown as MNN 1227 to avoid confusion) acquires a new IP prefix P42:: with which a new IP address P42::mnn1321 is configured. For old sessions between CN 1229 and MNN 1227 existing prior to the move, session continuity may be supported by enabling the session to continue to use the old SID (SID1321=P1321::mnn1321). Using host-based mobility support, MNN 1227 possesses FM and LMc functions. It sends a location update to its original access network so that the LM of the network supported by MR 1217 will have the location information such as an association of SID1321 (prefix P1321) to the new address P42::mnn1321. Then packets from CN 1229 may have to be forwarded from CN 1229 to GW 1221, then MR 1219, then MR 1217, then finally tunneled to MNN 1227 passing over AR 1225, which is a pinball route.

The example embodiments may avoid the pinball route as follows: MNN 1227 initiates a location update to send to the LM function in MR 1217, which then has the association (SID1321←→P42::mnn1321). Because the prefix P1321:: belongs to the block P132::/ which was delegated from MR 1219, and the network supported by MR 1219 is may provide mobility support and therefore possesses LM function, the LM of MR 1217 also forwards the location update for the session of MNN 1227 to the LM function of the network supported by MR 1219. Therefore, the LM in the network supported by MR 1219 also has the association (SID1321←→P42::mnn1321). Then, when packets destined to SID1321 reaches MR 1219, the LM would find a match to the association and therefore tunnel the packet directly from MR 1219 to MNN 1227.

In addition, the LM function in MR 1219 now has the association (SIM321←→P42::mnn1321) which triggers the following: because the prefix P1321:: belongs to the block P13:: which was delegated from first network 1205, and first network 1205 may provide mobility support and therefore possesses LM 1223, the LM of MR 1219 in turn also forwards this location update, e.g., reports the association, to first network 1205. Therefore, the LM in first network 1205 (i.e., LM 1223) now also has the association (SID1321←→P42::mnn1321). Then when packets destined to SID1321 reaches GW 1221 in first network 1205, the destination address of these packets would match with prefix P1321 in the association (SID1321←→P42::mnn1321) and therefore tunnel the packet directly from GW 1221 to MNN 1227 at the new address P42::mnn1321 with the tunnel as shown in FIG. 12*a*.

Figure 12B:
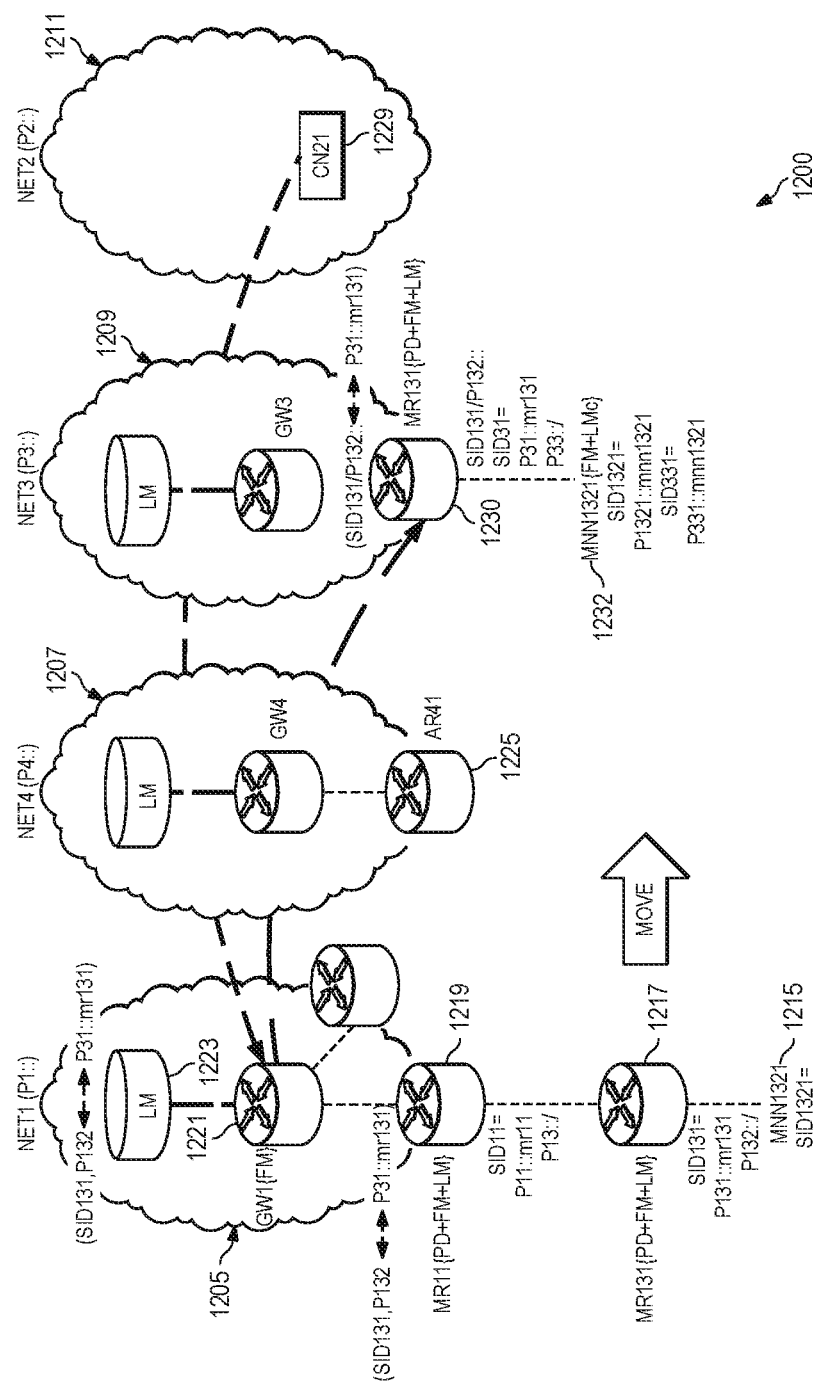
FIG. 12b illustrates a variation of example system highlighting MR mobility according to example embodiments described herein.

FIG. 12*b* illustrates a variation of example system 1200 highlighting MR mobility. As shown in FIG. 12*b*, MR 1217, which was attached to the network supported by MR 1219 and had the IP address P131::mr131, leaves the network and attaches to third network 1209. MR 1217 is now shown as MR 1230 to avoid confusion. It is allocated a new IP prefix P31 with which it configures its new IP routing address P31::mr131. It is also delegated a block of IP prefixes: P33:: from third network 1209 so that it may allocate prefix P331:: to MNN 1215 to configure the new IP routing address P331::mnn1321, which is now shown as MNN 1232. A location update is sent to the LM of the network supported by MR 1219 so that packets with destination address prefix P131:: or P132:: may be forwarded to P31::mr131. The LM of the network supported by MR 1219 may check that the prefixes P131:: and P132:: belongs to its network. Therefore, the LM is updated with the associations (SID131←→P31::mr131) and (P132::←→P31::mr131). These associations are abbreviated as (SID131,P132::←→P31::mr131) in FIG. 12*b*. The LM may also check that these prefixes (P131 and P132) belongs to the block P13::/ which is delegated from first network 1205. In addition, first network 1205 may provide mobility support with the location management function LM 1223. Therefore the LM of the network supported by MR 1219 forwards these location updates to LM 1223 in first network 1205. First network 1205 therefore also has these new location information. That is, LM 1223 in first network 1205 also have the associations (SID131, P132←→P31::mr131). There may be ongoing sessions with CN 1229 running in MNN 1232 using the session IP address P1321::mnn1321. When the packets of such sessions arrive at first network 1205, there is prefix match for this session IP address with the prefix P132. Therefore GW 1221 using the FM function may forward and/or tunnel these packets to the new address P31::mr131 of MR 1230. It is noted that had the location update not been forwarded to LM 1223 of first network 1205, these packets would be routed unnecessarily to MR 1219 first before being tunneled to MR 1230.

Figure 12C:
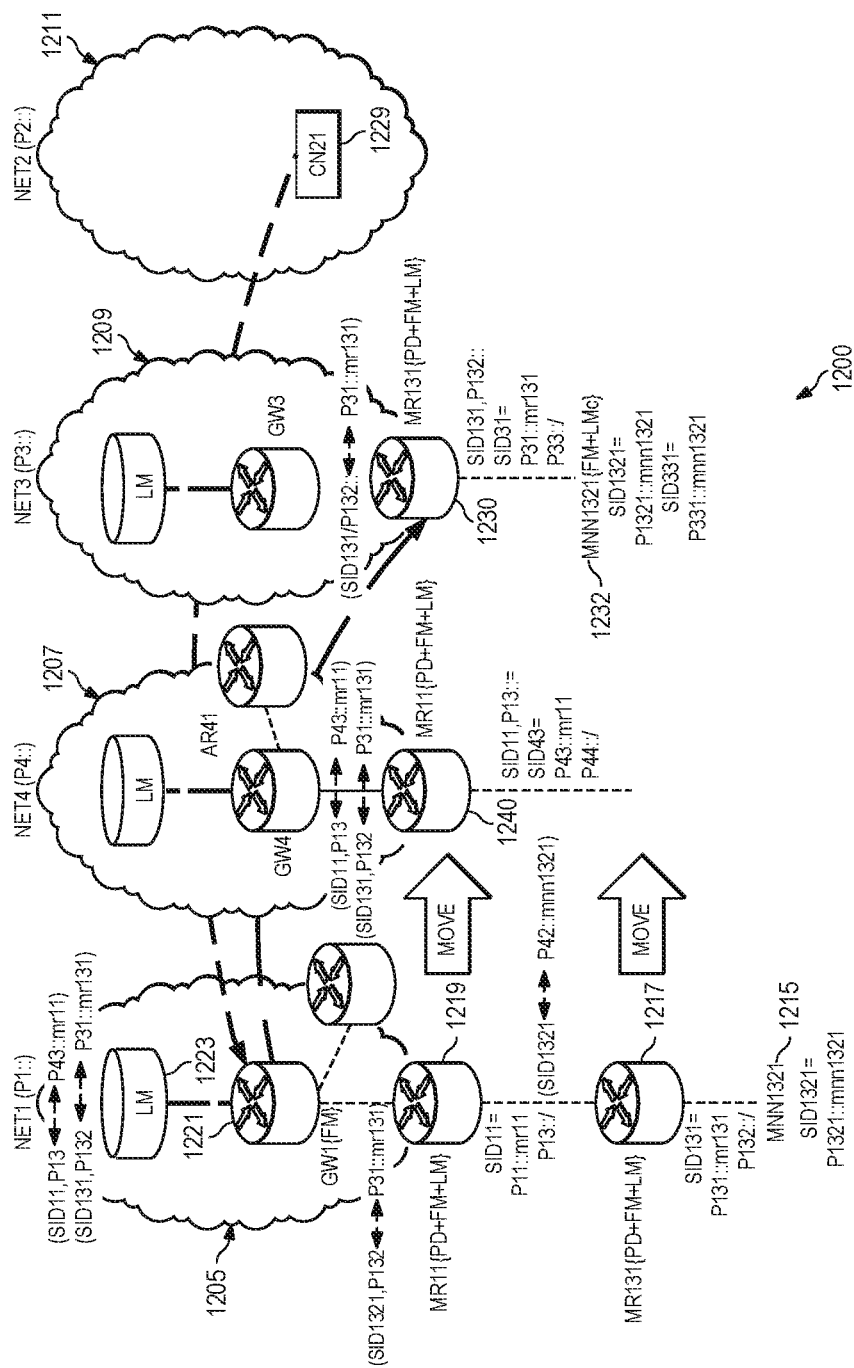
FIG. 12c illustrates a variation of example system highlighting mobility in two MRs according to example embodiments described herein.

FIG. 12C illustrates a variation of example system 1200 highlighting mobility in two MRs. After MR 1217 has moved (as shown in FIG. 12*b*, for example), MR 1219 moves to second network 1207, where it is now shown as MR 1240 to avoid confusion. In addition to the location updates, such as those described in FIG. 12*b*, the following location updates may be due to the movement of MR 1219 (now MR 1240). MR 1219 moves from first network 1205 to second network 1207, which allocates a new IP prefix P43:: to configure the new routing IP address P43::mr11. MR 1240 may also be delegated a new block of IP prefixes P44:: so that it may allocate IP prefixes to MNN's and MR's attached to the network that it supports. MR 1240 initiates a location update for its prefix P11:: and for its delegated prefix block P13::. An example implementation of this location update may be in terms of associations (P11←→P43::mr11) and (P13←→P43::mr11). The LM function of the network supported by MR 1240 may send this location update to LM 1223 of first network 1205. MNN 1232 has an ongoing session with CN 1229 using session IP address P1321::mnn1321. When packets from CN 1229 with this destination address arrive at first network 1205, there are 2 prefix matches at LM 1223 for this destination address, namely P13 and P131. With the shorter prefix match (P13), the association (P13←→P43::mr11) may suggest a longer pinball route to forward and/or tunnel the packets via MR 1240 to MR 1230. With the longer prefix match (P131), the association (P132←→P31::mr131) may suggest to directly forward and/or tunnel these packets to MR 1230 which supports the network to which MNN 1232 is attached. Therefore, the longer prefix match produces a shorter route.

Figure 12D:
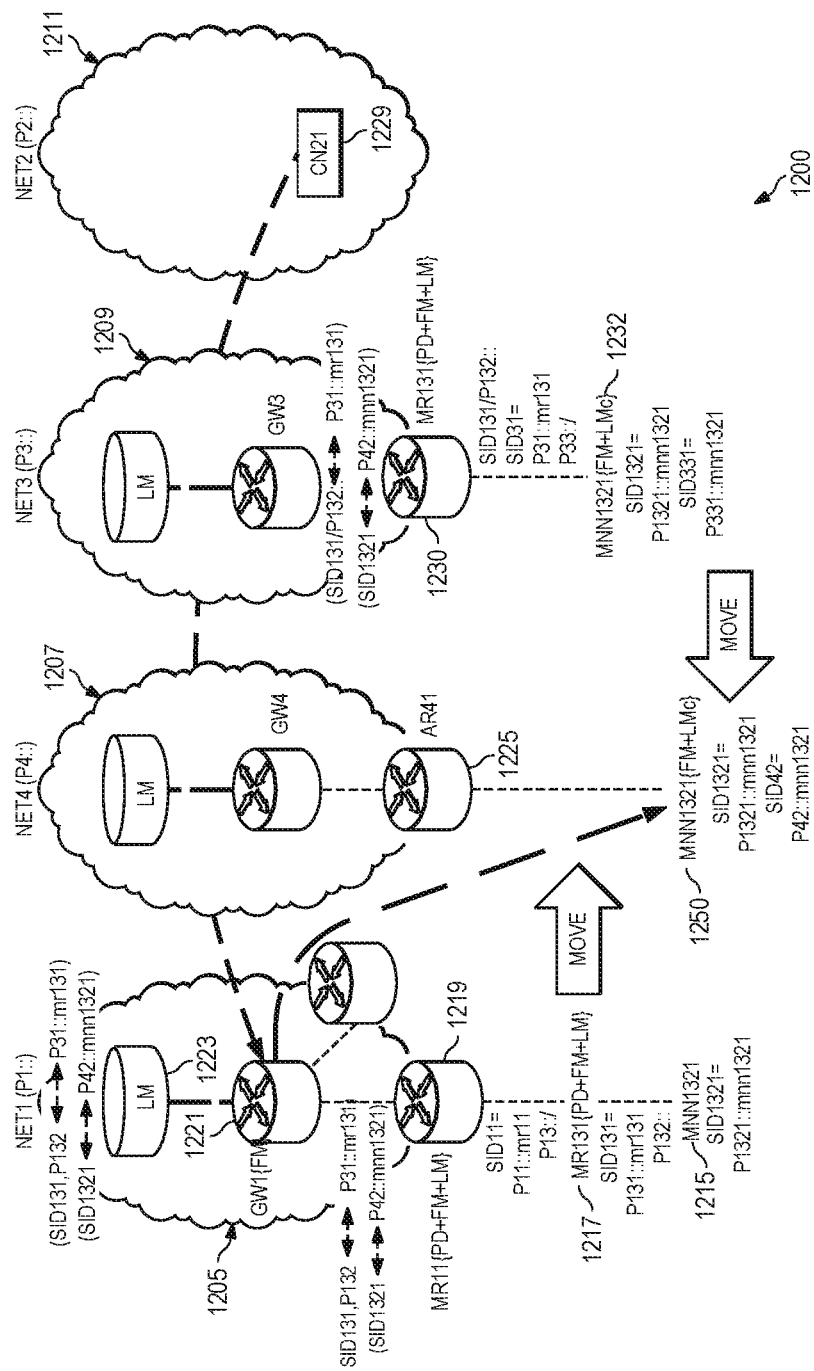
FIG. 12d illustrates a variation of example system highlighting mobility in a MR and a MNN according to example embodiments described herein.

FIG. 12d illustrates a variation of example system 1200 highlighting mobility in a MR and a MNN. As shown in FIG. 12d, MNN 1215 has moved as discussed in FIG. 12a, for example. MNN 1215 may have an ongoing session with CN 1229 using session IP address P1321::mnn1321. As described with FIG. 12b, when MR 1217 moves, its LM function initiated a location update for itself and for its delegated prefix block P132::/ to the LM of the network supported by MR 1219, which was also forwarded to LM 1223 of first network 1205. Also, as described with FIG. 12a, when MNN 1215 moved, it initiated location update for its prefix P1321:: to the LM of the network supported by MR 1217, which was also forwarded to the LM of the network supported by MR 1219, which was again forwarded to LM 1223 of first network 1205. Therefore, the different LMs in the different networks of system 1200 as shown in FIG. 12d have the combined location updates shown in FIG. 12a as well as those in FIG. 12b. When packets from CN 1229 arrives GW 1221 in first network 1205, the destination IP address will match to 2 prefixes (P132 and P1321). The location information with the shorter prefix match P132 may suggest a pinball route to first forward and/or tunnel these packets to the address P31::mr131 of MR1230 which will in turn forward and/or tunnel these packets to MNN 1250. The location information with the longer prefix match P1321 may suggest to directly forward and/or tunnel these packets to MNN 1250. Using the longest prefix match, the FM function at GW 1221 may take the more direct route to forward and/or tunnel these packets to the routing IP address P42::mnn1321 of MNN 1250.

Figure 12E:
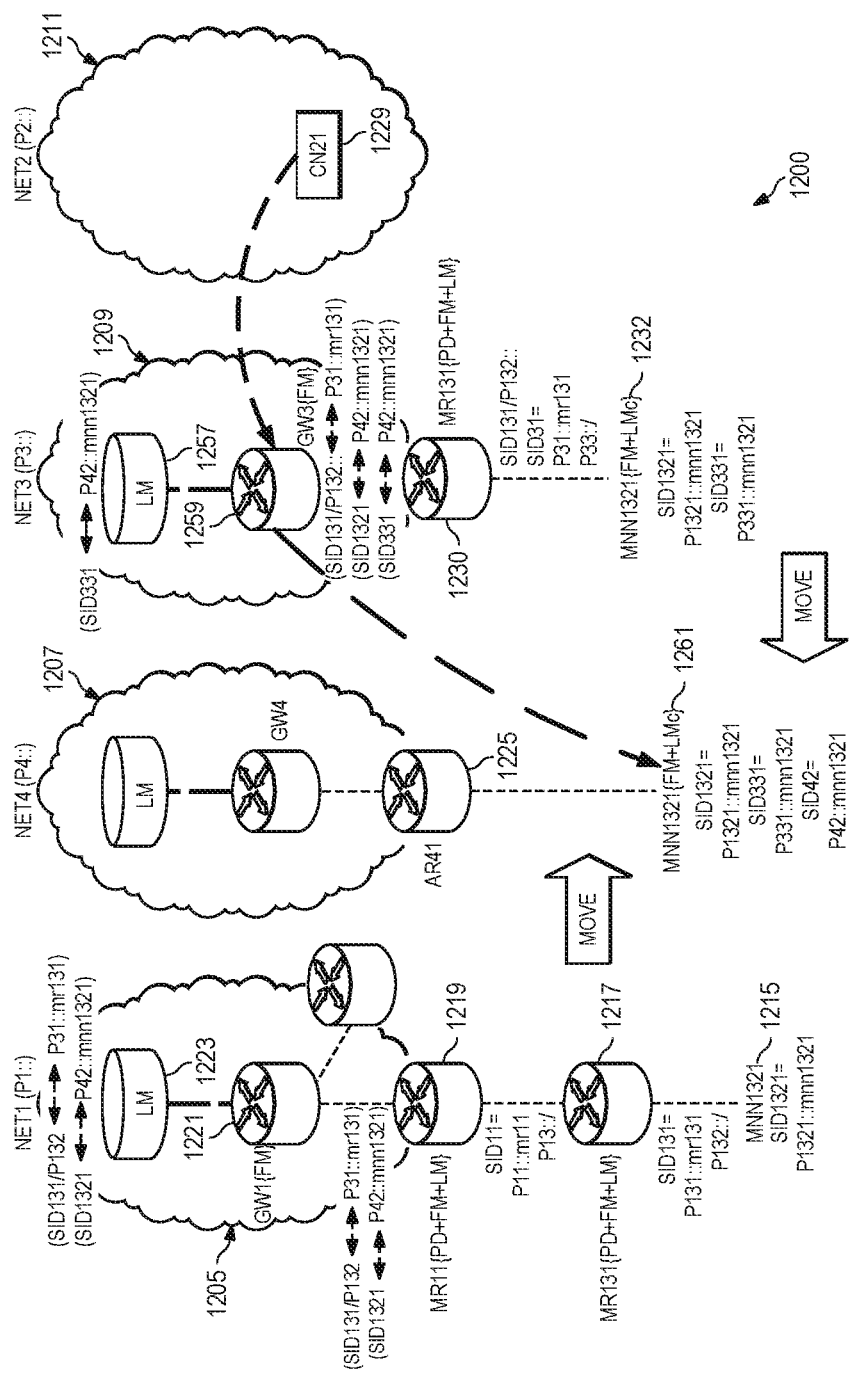
FIG. 12e illustrates a variation of example system highlighting successive moves with the movement of a MR as described in FIG. 12b followed by the movement of a MNN to a second network according to example embodiments described herein.

FIG. 12e illustrates a variation of example system 1200 highlighting successive moves with the movement of MR 1217 as described in FIG. 12b followed by the movement of MNN 1215 to second network 1207. MNN 1232 may have an ongoing session with CN 1229 using session IP address P331::mnn1321. As was described with FIG. 12b, when MR 1217 moved, its LM function initiated location update for itself and for its delegated prefix block P132::/ to the LM of the network supported by MR 1219, which was again forwarded to LM 1223 of first network 1205. An example implementation of such location update may be in terms of the associations (P131←→P31::mr131) and (P132←→P31::mr131). Also, as was described with FIG. 12a, when MNN 1232 moved, it initiated a location update for its prefix P1321 to the LM of the network supported by MR 1230, which was forwarded the LM of the network supported by MR 1219, which was again forwarded to LM 1223 of first network. An example implementation of such location update may be in terms of the association (P1321←→P42::mnn1321). In addition, the LMc function of MNN 1232 may initiate a location update for the prefix P331 to the LM of the network supported by MR 1230. The LM of the network supported by MR 1230 may update its information with this location update because this prefix belongs to its delegated block of prefixes P33::/. An example implementation of such location update may be in terms of the association (P331←→P42::mnn1321). Because this block of prefixes P33::/ is delegated from third network 1209 which may provide mobility support and therefore possesses the LM function 1257, the LM of the network supported by MR 1230 forwards this location update to LM 1257 of third network 1209. When these packets from CN 1229 arrives at GW 1259 in third network 1257, the destination IP address P331::mnn1321 will find prefix match with P331 so that the FM function at GW 1259 will take the direct route to forward and/or tunnel these packets to the routing IP address P42::mnn1321 of MNN 1261.

Figure 13:
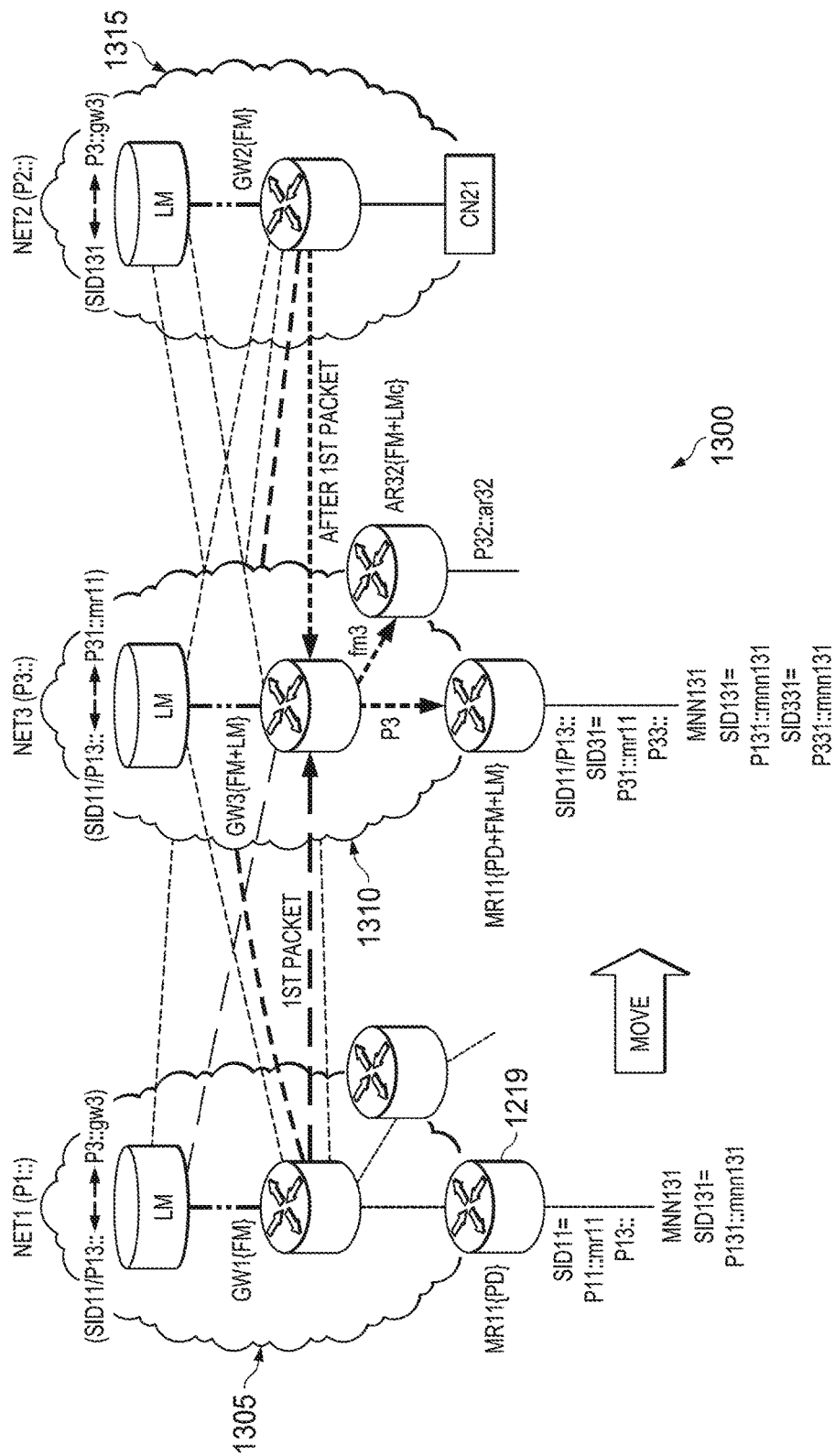
FIG. 13 illustrates an example system highlighting a distributed network implementing integrated network and host mobility management according to example embodiments described herein.

FIG. 13 illustrates an example system 1300 highlighting a distributed network implementing integrated network and host mobility management. System 1300 includes a first network 1305, a second network 1310, and a third network 1315. As part of the distributed network implementing network-based mobility management, each network may include a LM implementing the LM function of the network-based mobility management. The LMs in each network may form a distributed LM function. Each network may also include a FM function of the network-based mobility management located at an egress and/or ingress point of the network, such as at a GW. MRs present in the networks may implement the PD function, as well as the FM and/or LM functions as needed.

Integrated mobility support for both mobile host and mobile network may include the following: a LM function, a FM function, FM and LMc functions, mobility support, and GW functionality.

LM Function:

The LM function is a location management function to manage the location information for any node (host and/or router) which has moved to a different network. There is generally a LM server in each network holding the LM information for the entire network including those in the MRs. The FM function is shown as a separate logical function from the LM function, but depending on implementation, the different FM and the LM functions may be implemented in a collocated fashion.

A LM client (LMc) may obtain needed location information from the LM function and can send a location information update to the LM function. A node possessing host-based mobility management is capable of operating as a LMc. An AR participating in network-based mobility management for a mobile host that is lacking host-based mobility management capability may also have LMc functionality. Furthermore, while behaving as a mobile node, a MR has LMc functionality.

A MR may be the ingress and/or egress point to its mobile network. It is delegated a blocked of IP addresses from the network the MR is attached to, and it can therefore allocate globally reachable IP addresses to the MNNs in the mobile network. Behaving as the ingress and/or egress to the MNN, the MR therefore may also manage the location information for these nodes. The MR therefore also has LM server function towards the MNNs. Yet because the MR is delegated this block of IP address from the network and is using the mobility support from that network, it will also send such location information of the MNN to the network.

FM Function:

The FM function may be implemented at the GW of the network through which traffic goes into and out of the network. The FM function may also be implemented with each AR providing network-based mobility management as well as with each MN possessing host-based mobility management capability. In particular, an MR can behave as such an MN, and an MNN may also behave as such an MN. In addition, the FM function may be implemented at each MR so that the MR is capable of directing packets to and/or from the GW such as through tunnels when the MR moves away to a different network.

FM and LMc functions:

The GW, AR providing network-based mobility support, MNN possessing host-based mobility management capability, and MR may each possess FM+LMc functions, so that each can obtain the required information from the LM server. The FM function, together with the needed LM information, may enable each of these nodes to direct the routes properly to provide mobility support. Besides obtaining LM information from the LM server, each of GW, AR, and MR may cache any relevant LM information that it may need so that it can improve FM function performance. Since the LM server, as well as the FM functions, has all of the LM information for mobility management as well as network mobility management for that network, and each of them is accessible to all the information in the LM, the packets will not encounter pinball routes when within that network.

Mobility Support of a Mobile Host or a Mobile Router (MR) with a Mobile Network:

(1) When a mobile node (MN), which may be a mobile host or a mobile router, attaches to a network, the FM and LM provides mobility support to the MN.

(1a) The MR is delegated a block of IP prefixes from which it may allocate to the MNN's in its mobile network. An MNN in the mobile network of the MR (referred to as parent MR) may in turn be a MR (referred to as child MR), the parent MR may in turn delegate a block of IP prefixes (a sub-block out of the block of IP prefixes the parent MR was delegated) to the child MR from which the child MR may allocate to the MNN's in the child MR's mobile network. Again, an MNN of the child MR's mobile network may again be an MR (grandchild MR) and so on. In addition, although MR is used here, any of the MR may be a fixed router. An example of this is shown in FIG. 12.

(2) When a mobile host moves to a new network, the routing address may be the new IP address obtained from the new network, whereas the SID of an (application) session may be the IP address of the MN from the network of attachment where the mobile host has initiated a session. The association between the SID and the routing address of the mobile host is reported to the LM of that network of initial attachment for that session.

(3) When a MR moves to a new network, the routing address may be the new IP address obtained from the new network, whereas the SID of an (application) session may be the IP address of the MR from the network of attachment where the MNN of the MR's mobile network has initiated a session. The association between the SID and the routing address of the MR is reported to the LM of that network of initial attachment for that session. In addition, the block of IP prefixes delegated to the MR are also SID's. They may be aggregated to a shorter SID prefix. The association of this aggregated SID prefix to the MR's new routing address is also reported to the LM of the network that had delegated these prefixes to the MR.

(3a) When a child MR moves away from the mobile network of a parent MR, the association of SID of the child MR to the new IP routing address of the child MR as well as the association of the (aggregated) SID prefix of the child MR's delegated block of IP addresses to the routing address of the child MR, which are reported to the LM of the parent MR's network, are in turn reported to the network of attachment of the parent MR, which had delegated to the parent MR a larger block of IP prefixes out of which the parent MR had delegated the sub-block of IP prefixes to the child MR. An example of this is shown in FIG. 12.

(4) When a MNN possessing host-based mobility capability of an MR's mobile network moves to a new network, the routing address may be the new IP address obtained from the new network, whereas the SID of an (application) session may be the IP address of the MNN from the mobile network of attachment where the MNN of the MR's mobile network has initiated a session. The association between the SID and the routing address of the MNN is reported to the LM of that network of initial attachment for that session.

(4a) When that network of initial attachment for a session is the MR's mobile network, the association is in turn also reported to the LM of the network that had delegated the MR to allocate that IP prefix of the SID to the MNN and was also providing mobility support to the MR. An example of this shown in FIG. 12.

(4b) The rule of reporting association to the parent network may iterate as follows: When that network of initial attachment of the MR (child MR) for a session in the MNN of the mobile network of the child MR is in turn the mobile network of another MR (parent MR) having delegated prefix and providing mobility support to the child MR, the association reported from the LM of the child MR's network to the LM of the parent MR's network is in turn reported to the LM of the network that had delegated prefix and provided mobility support to the parent MR. An example of this shown in FIG. 12.

GW Functionality:

While pinball routes may be avoided within the same network as explained above, packets may still be bounced from one network to another. The GW may be able to perform route optimization to avoid the pinball routes from one network to another. First, the GW may add in one level of hierarchy for the routes. The GW of a network is the node that all packets to and/or from other networks must pass through. In the integrated mobility management, it also becomes a node for mobility management. In such a situation, packets from all other networks only need to be directed to the GW of the destination network. That is, all other networks participating in mobility support by being able to perform FM and LM functions; they only have to direct the packet to the GW of the appropriate network. As an illustrative example, the packet from CN21 destined to the deprecated address P131::mn131 of MNN131 is first routed to GW1. The FM function at GW1 finds from LM1 about the association (P131::,P3::rm3) so that it tunnels the packet to the address P3::rm3 of GW3. LM3 in Net3 has the association (P131::,P31::mr11). Therefore GW3 tunnels the packet to the address P31::mr11 of MR11, which then delivers the packet to MNN 1225. This path is shown in the dashed line in FIG. 12.

Optionally, new IP addresses are allocated from the new network so that new sessions can simple use direct routing. The old IP addresses are deprecated so that only sessions that are initiated prior to handover and need session continuity need to use mobility support. Then such longer routes are used much less often.

While packets may be forwarded using the route shown in the dashed line, GW1 and GW2 may communicate with each other so that the association (SID131, P3::rm3) is copied to GW2. After that, GW2 can directly tunnel the packet to GW3 as shown in the dotted line. This optimization method will avoid packets bounced through multiple GWs in different networks. The optimized tunnel goes from the GW of the sender's network to the GW of the receiver's network.

The route may optionally be further optimized to go from the AR of the sender to the MR, leaving only one tunnel segment in the network elements. Here, the tunnel does not go to the end nodes so the location privacy is not compromised.

Figure 14:
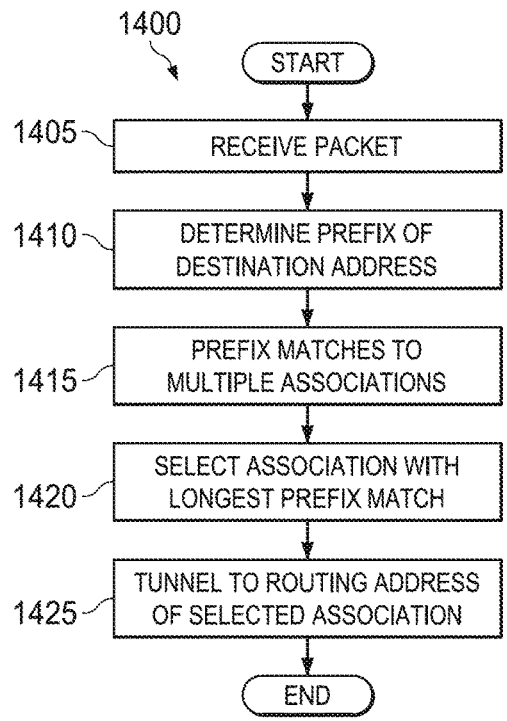
FIG. 14 illustrates a flow diagram of example operations occurring in the routing of a packet according to example embodiments described herein

FIG. 14 illustrates a flow diagram of example operations 1300 occurring in the routing of a packet. Operations 1400 may be indicative of operations occurring in a device of a network as the network receives a packet. Operations 1400 may be occurring in a FM function implemented at the device.

Operations 1400 may begin with the device receiving a packet (block 1405). The device may determine a destination address and a prefix of the destination address of the packet (block 1410). This destination address may be the SID. The device may search location information from the LM function, which contains a list of associations of SID to routing address. The search compares the destination address with the SID's in the list to determine if there are any associations in the association list that matches the beginning bits between the SID and the destination address. Any such association is referred to as a match. The matching prefix starts with the first bit and ends before the corresponding bits in the SID and in the destination address begins to differ. Therefore the matching prefix can differ in length, and the match with the longest matching prefix is called the longest prefix match. For discussion purposes, a situation where there are multiple associations each with an SID that matches the prefix of the destination address (block 1415). For example, one matching prefix may be 56 bits long whereas another matching prefix may be 48 bits long. Then the 56-bit long prefix has the longer match. When there are multiple matches, the association with the longest prefix match is selected (block 1420). The packet is tunneled to the routing address in accordance with the selected association (block 1425).

Figure 15A:
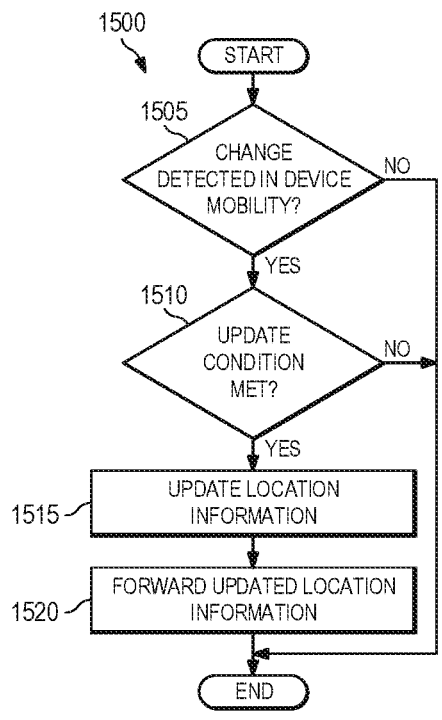
FIG. 15a illustrates a flow diagram of example operations occurring in initiating a location update according to example embodiments described herein.

FIG. 15a illustrates a flow diagram of example operations 1500 occurring in initiating a location update. Operations 1500 may be indicative of operations occurring in a first device implementing an LM function for a second device of a mobile network. Examples of the first device may include MNNs, MRs, ARs, GWs, stand-alone LM devices, and the like.

Operations 1500 may begin with the first device detecting a change in mobility of a second device (block 1505). Changes in mobility of a device may include the device leaving a mobile network to another network, where the other network may or may not be mobile. The second device may be a MNN, a MR, and the like. The first device may be the same as the second device. If the first device detects the change in the mobility of the second device, the first device may perform a check to determine if an update condition has been met (block 1510). The update condition may be dependent on the first device (or where the LM function is being implemented). Examples of update conditions may include, but are not limited to:

Case 1) When the MNN (the first device) has an LMc function (i.e., client-based mobile IP is being used):
  Update condition=The second device (also the first device) changes from a first network to a second network.
Case 2) When an AR (the first device) has an LMc function (i.e., proxy mobile IP is being used):
  Update condition=The MNN (the second device) moves away from a first network and attaches to a network supported by the AR and the MNN has an ongoing session using an address of the first network.
Case 3) When a MR (the first device) has a LMc function:
  Update condition=The MR moves from a first network to a second network and the MR is supporting a third network that is moving with the MR.

If the update condition is met, the first device may update location information related to the second device (block 1515). In other words, the first device may update its LM function. As an illustrative example, the first device may generate an association for a prefix of an existing address of the second device to a routing address of the second device. Aggregation may be used to combine multiple associations into a smaller number of associations to simplify notation. The first device may forward the updated location information (block 1520). Where the updated location information is sent may be dependent on the first device. If the first device is the MNN (case 1 above), the updated location information may be sent to a parent of a router supporting the first network. If the first device is an AR (case 2 above), the updated location information may be sent to a device implementing the LM function of the network associated with the address from the first network. If the first device is a MR (case 3 above), the updated location information is sent to a device implementing the LM function of the first network along with updated location information of all MNNs attached to the third network. It is noted that the updated location information may be sent through intermediate routers with or without mobility support. However, LM functions implemented at the first device and at its parent network implement the LM function in an integrated manner. If the first device detects no change in the mobility of the second device or if the update conditions are not met, operations 1500 may terminate.

Figure 15B:
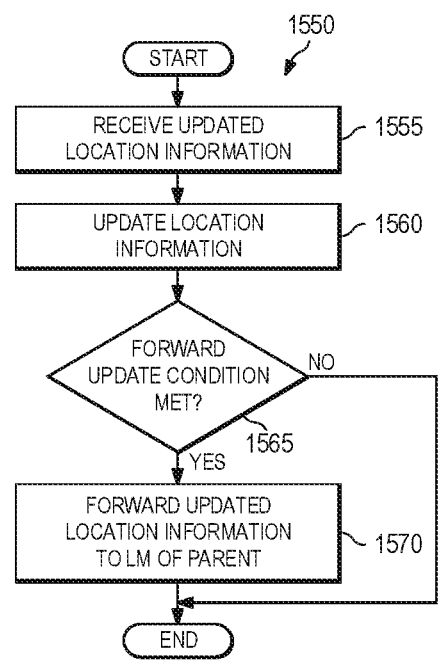
FIG. 15b illustrates a flow diagram of example operations occurring in propagating a location update according to example embodiments described herein.

FIG. 15b illustrates a flow diagram of example operations 1550 occurring in propagating a location update. Operations 1550 may be indicative of operations occurring in a first device propagating a location update. Examples of the first device may include MRs, ARs, GWs, stand-alone LM devices, and the like.

Operations 1550 may begin with the first device receiving updated location information (block 1555) The updated location information may be from a second device implementing a LM function in a child network of the first device for a third device moving from a first network to a second network. The first device updates its own location information with the updated location information (block 1560). As an illustrative example, the updated location information comprises an association for the second device. The first device may add the association to its LM function. Aggregation may be used to combine multiple associations into a smaller number of associations to simplify notation. The first device may perform a check to determine if a forward update condition is met (block 1565). Examples of the forward update condition may include, but are not limited to:
  The session prefix of a session involving the third device belongs in a block of prefixes delegated from a parent network of the first network; and
  The parent network of the first network provides mobility support.

If the forward update condition is met, the first device may forward the updated location information to a LM function of its parent network (block 1570). If the forward update conditions are not met, operations 1550 may terminate.

Figure 16:
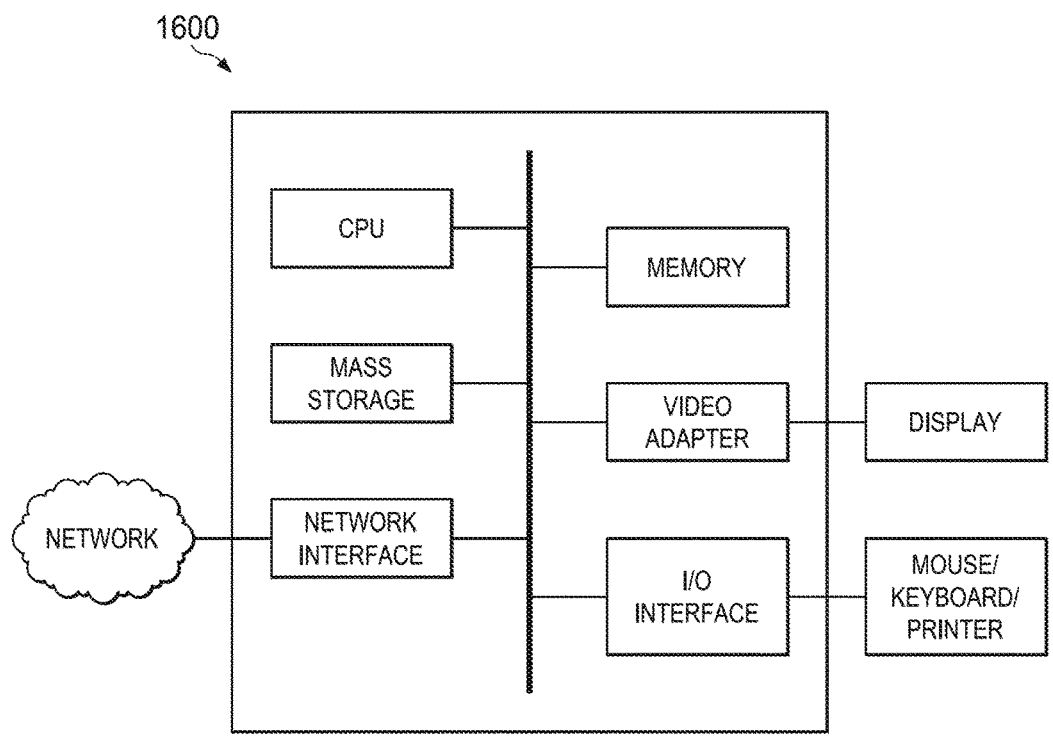
FIG. 16 is a block diagram of an example processing system that may be used for implementing the devices and methods disclosed herein.

FIG. 16 is a block diagram of an example processing system 1600 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for routing a packet, the method comprising:
receiving, by a gateway in a first network, a packet specifying an initial destination address of a mobile node;
sending, by the gateway, a query request requesting mobility information to a location server upon determining that the initial destination address is not associated with any routing address in a routing table associated with the first network, the routing table being maintained by the gateway, the location server maintaining external routing addresses of mobile nodes that have left the first network;
receiving, by the gateway, a query response from the location server in response to the query request, the query response including a longest prefix match between a prefix of the initial destination address and a prefix of a new destination address, the new destination address being one of the external routing addresses maintained by the location server; and
appending, by the gateway, the new destination address to the packet, and based thereon forwarding the packet to the new destination address, wherein the mobile node is anchored to a mobile router that moved from the first network to a second network, and wherein the new destination address is assigned to the mobile router in the second network.

2. The method of claim 1, wherein the new destination address is a routing address assigned to the mobile router in a second network.

3. The method of claim 1, further comprising:
saving the new destination address as an external routing address in the routing table.

4. A gateway in a network, the gateway comprising:
a processor; and
a non-transitory computer readable storage medium storing programming for execution by the processor, the programming including instructions to:
receive a packet specifying an initial destination address of a mobile node;
send a query request requesting mobility information to a location server upon determining that the initial destination address is not associated with any routing address in a routing table associated with the first network, the routing table being maintained by the gateway, the location server maintaining external routing addresses of mobile nodes that have left the first network;
receive a query response from the location server in response to the query request, the query response including a longest prefix match between a prefix of the initial destination address and a prefix of a new destination address, the new destination address being one of the external routing addresses maintained by the location server; and
append the new destination address to the packet, and based thereon forward the packet to the new destination address, wherein the mobile node is anchored to a mobile router that moved from the first network to a second network, and wherein the new destination address is assigned to the mobile router in the second network.

5. The gateway of claim 4, wherein the new destination address is a routing address assigned to the mobile router in the second network.

6. The gateway of claim 4, wherein the programming further includes instructions to:
save the new destination address as an external routing address in the routing table.

7. A computer program product comprising a non-transitory computer readable storage medium storing programming for installation in a first device, the programming including instructions to:
receive a packet specifying an initial destination address of a mobile node;
send a query request requesting mobility information to a location server upon determining that the initial destination address is not associated with any routing address in a routing table associated with the first network, the routing table being maintained by the gateway, the location server maintaining external routing addresses of mobile nodes that have left the first network;
receive a query response from the location server in response to the query request, the query response including a longest prefix match between a prefix of the initial destination address and a prefix of a new destination address, the new destination address being one of the external routing addresses maintained by the location server; and append the new destination address to the packet, and based thereon forward the packet to the new destination address, wherein the mobile node is anchored to a mobile router that moved from the first network to a second network, and wherein the new destination address is assigned to the mobile router in the second network.

8. The computer program product of claim 7, wherein the new destination address is a routing address assigned to the mobile router in the second network, the second network being different than the first network.

9. The computer program product of claim 7, wherein the programming further includes instructions to:
   save the new destination address as an external routing address in the routing table.

* * * * *